US009069490B2

(12) United States Patent
Morikawa et al.

(10) Patent No.: US 9,069,490 B2

(45) Date of Patent: Jun. 30, 2015

(54) SOURCE DEVICE, COMMUNICATION SYSTEM, METHOD OF CONTROLLING SOURCE DEVICE, AND METHOD OF CONTROLLING SINK DEVICE

(71) Applicant: Sony Corporation, Tokyo (JP)

(72) Inventors: Keiji Morikawa, Kanagawa (JP); Satoshi Kametani, Tokyo (JP); Makoto Imai, Tokyo (JP); Kazumasa Nishimoto, Saitama (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/153,252

(22) Filed: Jan. 13, 2014

(65) Prior Publication Data

US 2014/0205046 A1 Jul. 24, 2014

(30) Foreign Application Priority Data

Jan. 18, 2013 (JP) ................................ 2013-007027

(51) Int. Cl.
*G06F 1/12* (2006.01)

(52) U.S. Cl.
CPC ....................................... *G06F 1/12* (2013.01)

(58) Field of Classification Search
CPC . H04N 5/765; H04N 21/42204; H04N 21/47; H04N 21/485; H04N 21/43635; H04N 5/775; H04L 7/0008
USPC .......................................... 375/295, 220, 356
See application file for complete search history.

(56) References Cited

U.S. PATENT DOCUMENTS

2006/0002483 A1* 1/2006 Kim .............................. 375/257
2013/0127645 A1* 5/2013 Shibata ......................... 341/100

FOREIGN PATENT DOCUMENTS

JP 2006-042219 2/2006

* cited by examiner

*Primary Examiner* — Kabir A Timory
(74) *Attorney, Agent, or Firm* — Wolf, Greenfield & Sacks, P.C.

(57) ABSTRACT

A source device includes: a low-speed data supply section configured to supply, as low-speed data, data generated in synchronization with a low clock signal out of clock signals having different frequencies, the low clock signal having a frequency lower than a predetermined value; a high-speed data supply section configured to supply, as high-speed data, data generated in synchronization with a high clock signal out of the clock signals, the high clock signal having a frequency higher than that of the low clock signal; a dividing section configured to divide the low-speed data into a predetermined number of pieces of data in accordance with a ratio between the frequencies of the high and low clock signals; and a data transmitting section configured to store the high-speed data and the divided pieces of low-speed data in data having a predetermined data size, and to transmit the stored data.

19 Claims, 22 Drawing Sheets

| TOGGLE SIGNAL in_togl_1 | TOGGLE SIGNAL in_togl_2 | OPERATION OF OUTPUT-SIDE SET SIGNAL GENERATION SECTION |
|---|---|---|
| 0 | 0 | NEGATE OUTPUT-SIDE SET SIGNAL out_set |
| 0 | 1 | ASSERT OUTPUT-SIDE SET SIGNAL out_set |
| 1 | 0 | |
| 1 | 1 | NEGATE OUTPUT-SIDE SET SIGNAL out_set |

FIG. 6

| out_set | ck_b | OPERATION OF OUTPUT-SIDE COUNTER |
|---|---|---|
| 0 | 0 | — |
| | 1 | COUNT UP COUNT VALUES out_cnt. WHEN COUNT VALUE out_cnt IS "5", HOLD THE VALUE |
| 1 | 0 | — |
| | 1 | SET COUNT VALUE out_cnt TO INITIAL VALUE |

FIG. 7

| out_set | out_shift | OPERATION OF SHIFT REGISTER |
|---|---|---|
| 1 | 0 | HOLD D4' |
| | 1 | × |
| 0 | 0 | — |
| | 1 | SEQUENTIALLY OUTPUT BITS (d4) IN D4' IN SYNCHRONIZATION WITH CLOCK SIGNAL ck_b |

FIG. 10

SOURCE DEVICE, COMMUNICATION SYSTEM, METHOD OF CONTROLLING SOURCE DEVICE, AND METHOD OF CONTROLLING SINK DEVICE

CROSS REFERENCE TO RELATED APPLICATIONS

This application claims the benefit of Japanese Priority Patent Application JP 2013-007027 filed Jan. 18, 2013, the entire contents of each which are incorporated herein by reference.

BACKGROUND

The present technology relates to a source device, to a communication system, and to a method of controlling a source device. More in detail, the present technology relates to a source device, a communication system, and a method of controlling a source device that transmit a plurality of signals having different speeds.

As an interface for transmitting and receiving image signals, audio signals, etc. between devices, interfaces such as HDMI (High-Definition Multimedia Interface) and DVI (Digital Video Interface) have been used. Some of these interface standards are capable of transmitting and receiving image signals and audio signals with the use of one cable by multiplexing the audio signals on the image signals. Examples of such standards that are capable of multiplexing the image and audio signals may include HDMI.

When the image signals and the audio signals are transmitted in a manner that the audio signals are multiplexed on the image signals in accordance with a standard such as HDMI, in general, a source device transmits the audio signals in a blanking period of vertical synchronous signals, horizontal synchronous signals, etc. (for example, see Japanese Unexamined Patent Application Publication No. 2006-42219).

SUMMARY

In the above-described existing technology, a plurality of image signals may not be transmitted at the same time. One reason for this is that, often, the image signals may not be included in the blanking period since a data amount of the image signals is larger than a data amount of the audio signals. Therefore, when the plurality of image signals are transmitted at the same time in accordance with the standard such as HDMI, the source device transmits the plurality of image signals separately via a plurality of cables without multiplexing the image signals.

It is desirable to transmit a plurality of image signals at the same time via one cable.

According to an embodiment of the present technology, there is provided a source device including: a low-speed data supply section configured to supply, as low-speed data, data generated in synchronization with a low clock signal out of a plurality of clock signals having different frequencies, the low clock signal having a frequency that is lower than a predetermined value; a high-speed data supply section configured to supply, as high-speed data, data generated in synchronization with a high clock signal out of the plurality of clock signals, the high clock signal having a frequency that is higher than the frequency of the low clock signal; a dividing section configured to divide the low-speed data into a predetermined number of pieces of data, the predetermined number being in accordance with a ratio of the frequency of the high clock signal with respect to the frequency of the low clock signal; and a data transmitting section configured to store the high-speed data and the divided pieces of low-speed data in data having a predetermined data size, and to transmit the stored data. Accordingly, it is possible to obtain an effect that the high-speed data and the divided pieces of low-speed data are stored in the data having the predetermined data size to be transmitted.

According to an embodiment of the present technology, there is provided a method of controlling a source device, the method including: supplying, through a low-speed data supply section, as low-speed data, data generated in synchronization with a low clock signal out of a plurality of clock signals having different frequencies, the low clock signal having a frequency that is lower than a predetermined value; supplying, through a high-speed data supply section, as high-speed data, data generated in synchronization with a high clock signal out of the plurality of clock signals, the high clock signal having a frequency that is higher than the frequency of the low clock signal; dividing, through a dividing section. the low-speed data into a predetermined number of pieces of data, the predetermined number being in accordance with a ratio of the frequency of the high clock signal with respect to the frequency of the low clock signal; and storing, through a data transmitting section, the high-speed data and the divided pieces of low-speed data in data having a predetermined data size, and transmitting, through the data transmitting section, the stored data. Accordingly, it is possible to obtain an effect that the high-speed data and the divided pieces of low-speed data are stored in the data having the predetermined data size to be transmitted.

In one embodiment, a holding section configured to hold, in synchronization with the high clock signal, the supplied low-speed data as the predetermined number of pieces of data may be further included. The dividing section may sequentially read, in synchronization with the high clock signal, the respective predetermined number of pieces of data from the holding section, and may supply the read predetermined number of pieces of data as the divided pieces of low-speed data. Accordingly, it is possible to obtain an effect that the low-speed data is held as the predetermined number of pieces of data in synchronization with the high clock signal, and the respective plurality of pieces of data are sequentially read in synchronization with the high clock signal.

In one embodiment, the dividing section may include: a counter configured to count a count value in synchronization with the high clock signal; and a selector configured to sequentially select, based on the count value, the respective predetermined number of pieces of data, and read the selected respective predetermined number of pieces of data. Accordingly, it is possible to obtain an effect that the respective predetermined number of pieces of data are sequentially selected, based on the count value counted in synchronization with the high clock signal, and read the selected data.

In one embodiment, the holding section may include a shift register configured to hold the low-speed data, and to shift and sequentially output respective bits of the held low-speed data in accordance with control by the dividing section, and the dividing section may sequentially supply, as the divided pieces of low-speed data, the respective bits of the low-speed data output from the shift register in synchronization with the high clock signal. Accordingly, it is possible to obtain an effect that the respective bits of the low-speed data output from the shift register are sequentially supplied as the divided low-speed data in synchronization with the high clock signal.

In one embodiment, the high-speed data may include image data, and the low-speed data may include audio data. Accordingly, it is possible to obtain an effect that the high-speed data including the image data and the low-speed data including the audio data is transmitted.

In one embodiment, the high-speed data may include uncompressed data that is not compressed, and the low-speed data may include compressed data that is compressed to a data size smaller than a data size of the uncompressed data. Accordingly, it is possible to obtain an effect that the high-speed data including the uncompressed data and the low-speed data including the compressed data are transmitted.

In one embodiment, the low-speed data supply section may supply, as the low-speed data, digital data that is converted from predetermined analog data in synchronization with the low clock signal. Accordingly, it is possible to obtain an effect that the digital data converted from the analog data is supplied as the low-speed data.

In one embodiment, the high-speed data supply section may supply, as the high-speed data, digital data that is converted from predetermined analog data in synchronization with the high clock signal. Accordingly, it is possible to obtain an effect that the digital data converted from the analog data is supplied as the low-speed data.

According to an embodiment of the present technology, there is provided a communication system including: a low-speed data supply section configured to supply, as low-speed data, data generated in synchronization with a low clock signal out of a plurality of clock signals having different frequencies, the low clock signal having a frequency that is lower than a predetermined value; a high-speed data supply section configured to supply, as high-speed data, data generated in synchronization with a high clock signal out of the plurality of clock signals, the high clock signal having a frequency that is higher than the frequency of the low clock signal; a dividing section configured to divide the low-speed data into a predetermined number of pieces of data, the predetermined number being in accordance with a ratio of the frequency of the high clock signal with respect to the frequency of the low clock signal; and a data transmitting section configured to store the high-speed data and the divided pieces of low-speed data in data having a predetermined data size, and to transmit the stored data; a data receiving section configured to receive the transmitted data having the predetermined data size; and a restore section configured to restore the low-speed data before being divided from the divided pieces of low-speed data in the received data having the predetermined data size. Accordingly, it is possible to obtain an effect that the high-speed data and the divided pieces of low-speed data are stored in the data having the predetermined data size to be transmitted.

In one embodiment, the dividing section may generate a flag indicating whether or not the divided piece of low-speed data is data to be transmitted first in a clock cycle of the low-clock signal, the data transmitting section may further store the flag in the data having the predetermined data size, and the restore section may restore the low-speed data before being divided from the predetermined number of the divided pieces of low-speed data that are sequentially received from reception of the flag indicating that the divided piece of low-speed data is the data to be transmitted first. Accordingly, it is possible to obtain an effect that the low-speed data before being divided is restored from the predetermined number of pieces of divided low-speed data that is sequentially received from the reception of the flag.

In one embodiment, the dividing section may start division of the low-speed data after generating header information, dividing the header information, and supplying the divided pieces of header information to the data transmitting section, the header information indicating a timing to start transmission of the low-speed data. The data transmitting section may start transmission of the data having the predetermined data size in which the divided pieces of low-speed data is stored after storing the divided pieces of header information in the data having the predetermined data size and transmitting the stored data. The restore section may start restoration of the low-speed data after restoring the header information. Accordingly, it is possible to obtain an effect that the restoration of the low-speed data is started after the header information is restored.

According to the above-described embodiments of the present technology, a favorable effect is achieved that the source device is allowed to transmit the plurality of image signals at the same time via one cable.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 6 is a diagram illustrating an example of an operation of an output-side set signal generation section in the embodiment.

FIG. 7 is a diagram illustrating an example of an operation of an output-side counter in the embodiment.

FIG. 10 is a diagram illustrating an example of an operation of a shift resister in the embodiment.

DETAILED DESCRIPTION

Some embodiments of the present technology (hereinafter, referred to as "embodiment") will be described below. The description will be provided in the following order.

1. Embodiment (an example of transmitting high-speed data and divided pieces of low-speed data)
2. Modifications

[1. Embodiment]

[Configuration Example of Communication System]

Figure 1:
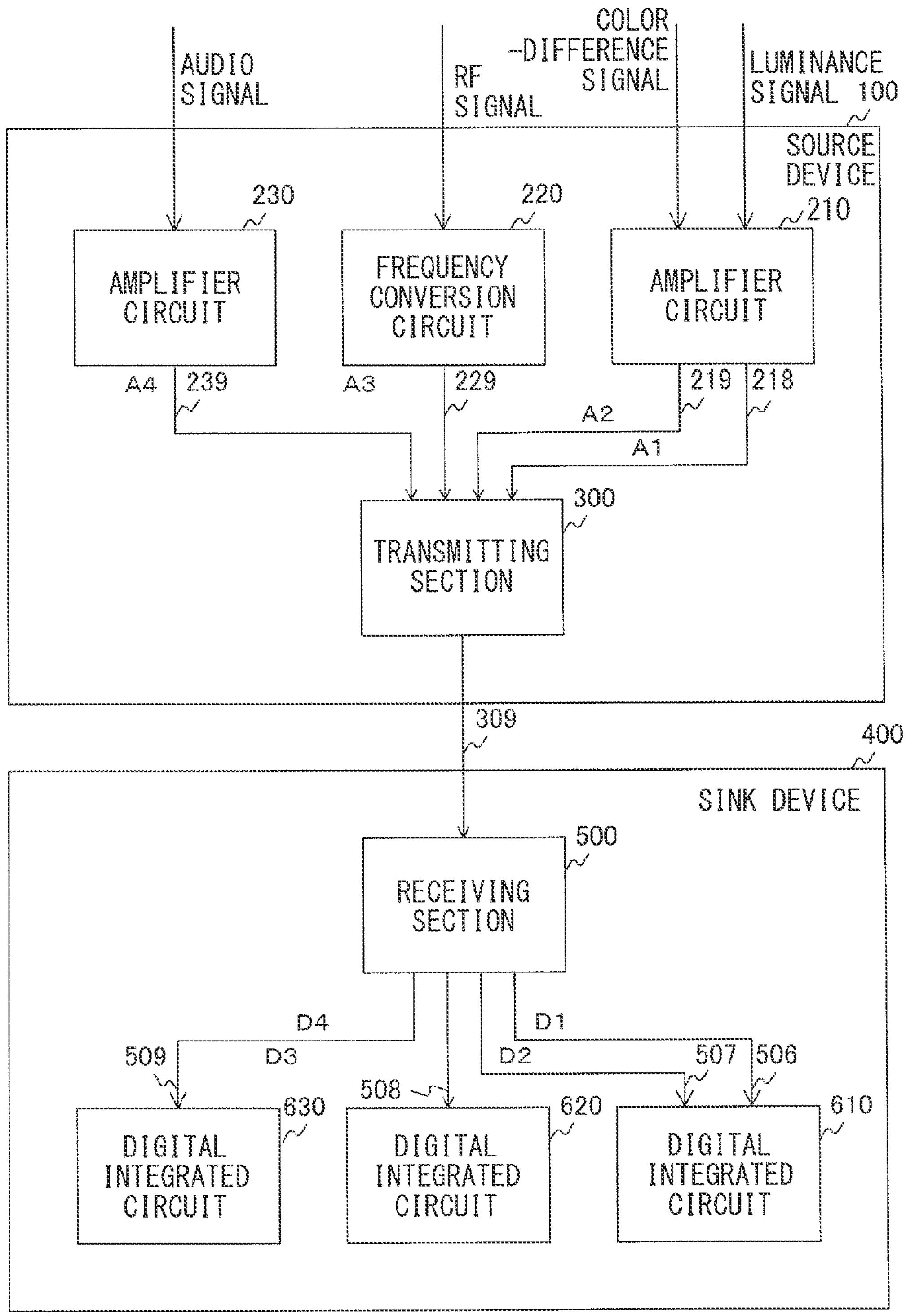
FIG. 1 is an overall diagram illustrating a configuration example of a communication system according to an embodiment.

FIG. 1 is an overall diagram illustrating a configuration example of a communication system in an embodiment. The communication system is a system for recording or reproducing an image, audio, etc., and includes a source device 100 and a sink device 400.

The source device 100 transmits signals such as image signals and audio signals to the sink device 400. The source device 100 includes amplifier circuits 210 and 230, a frequency conversion circuit 220, and a transmitting section 300.

The amplifier circuit 210 amplifies an analog luminance signal and an analog color-difference signal. The amplifier circuit 210 obtains a luminance signal and a color-difference signal, for example, from an outside device connected to the source device 100, amplifies the obtained luminance and color-difference signals, and removes noises from the amplified luminance and color-difference signals if necessary. The amplifier circuit 210 supplies data of the luminance signal and data of the color-difference signal as analog data A1 and analog data A2 to the transmitting section 300 via signal lines 218 and 219, respectively.

The frequency conversion circuit 220 acquires a broadcast signal, for example, from a tuner or the like, and converts a frequency of the acquired broadcast signal. For example, the frequency conversion circuit 220 acquires an RF (Radio Frequency) signal as the broadcast signal, and converts a frequency of the obtained RF signal to generate an intermediate frequency (IF) signal. The frequency conversion circuit 220 supplies data of the intermediate frequency signal as analog data A3 to the transmitting section 300 via a signal line 229. The analog data A3 may be broadcast data that includes image data that is compressed based on compression algorism of a predetermined codec.

The amplifier circuit 230 amplifies an analog audio signal. The amplifier circuit 230 acquires an audio signal, for example, from an outside device connected to the source device 100, amplifies the acquired audio signal, and removes noises from the amplified audio signal, if necessary. The amplifier circuit 230 supplies the data of the audio signal as analog data A4 to the transmitting section 300 via a signal line 239.

The transmitting section 300 converts the analog data A1 to A4 into digital data D1 to D4, respectively, and transmits the digital data D1 to D4 to the sink device 400. In this example, the analog data A1 and the analog data A2 are a luminance signal and a color-difference signal, respectively, included in one image signal which is not compressed. Therefore, the same sampling frequency is used for both the analog data A1 and the analog data A2 when the conversion into digital data is performed thereon. The analog data A3 is compressed data, and has a data size that is smaller than a data size of the uncompressed analog data A1. Therefore, a sampling frequency used for the analog data A3 is lower than the sampling frequency for the analog data A1. Further, since a sampling frequency for an audio data is typically lower than a sampling frequency for an image data, a sampling frequency for the analog data A4 (audio data) is lower than the sampling frequency for the analog data A1 (image data).

The transmitting section 300 allows the phases of the digital data D1 to D4 to match and allows the digital data D1 to D4 to synchronize. Further, the transmitting section 300 multiplexes the synchronized digital data D1 to D4, and transmits the multiplexed data to the sink device 400 via one cable 309. As the cable 309, for example, an HDMI cable may be used.

The sink device 400 receives signals such as an image signal from the source device 100, and processes the received signals. The sink device 400 includes a receiving section 500, and digital integrated circuits 610, 620, and 630. The receiving section 500 receives the digital data D1 to D4 from the source device 100 via the cable 309. The receiving section 500 separates the digital data D1 and D2 from each other. The receiving section 500 supplies the separated digital data D1 and D2 to the digital integrated circuit 610 via signal lines 506 and 507, respectively. Further, the receiving section 500 separates the digital data D3 and supplies the separated digital data D3 into the digital integrated circuit 620 via a signal line 508. Further, the receiving section 500 separates the digital data D4 and supplies the separated digital data D4 to the digital integrated circuit 630 via a signal line 509.

The digital integrated circuit 610 processes the digital data D1 and D2. The digital integrated circuit 610 may record the digital data D1 and D2 in a recording medium, a storage device, or the like, for example. Further, the digital integrated circuit 610 converts the digital data D1 and D2 into an analog luminance signal and an analog color-difference signal, respectively, and reproduces the converted signals.

The digital integrated circuit 620 processes the digital data D3. The digital integrated circuit 620 may record the digital data D3 in a recording medium, a storage device, or the like, for example. Further, the digital integrated circuit 620 converts the digital data D3 into analog data such as analog image data and analog audio data, and reproduces the converted analog data.

The digital integrated circuit 630 processes the digital data D4. The digital integrated circuit 630 may record the digital data D4 in a recording medium, a storage device, or the like, for example. Further, the digital integrated circuit 630 converts the digital data D4 into an analog audio signal, and reproduces the converted analog audio signal.

It is to be noted that the source device 100 may transmit signals of R (Red), G (Green), and B (Blue) instead of the luminance signal and the color-difference signal. Also, a combination of signals to be transmitted is not limited to the above-described combination as long as the combination includes a plurality of image signals having different speeds.

For example, the source device 100 may multiplex only a plurality of image signals having different sampling frequencies from one another and transmit the multiplexed image signals without multiplexing an audio signal thereon. Further, the source device 100 may further multiplex a plurality of audio signals having different sampling frequencies from one another in addition to the plurality of image signals, and transmit the multiplexed signals.

The sink device 400 may further include a BOST (Built-Out Self-Test) circuit connected to the digital integrated circuits 610, 620, and 630. The BOST circuit performs measurement, analysis, etc. on the signals transmitted from a device (for example, an ADC 310) which is a target of the test outside the targeted device. By including the BOST circuit in the sink device 400, it is possible to perform simultaneous testing of functions, such as an A/D conversion function, of the source device 100.

[Configuration Example of Transmitting Section]

Figure 2:
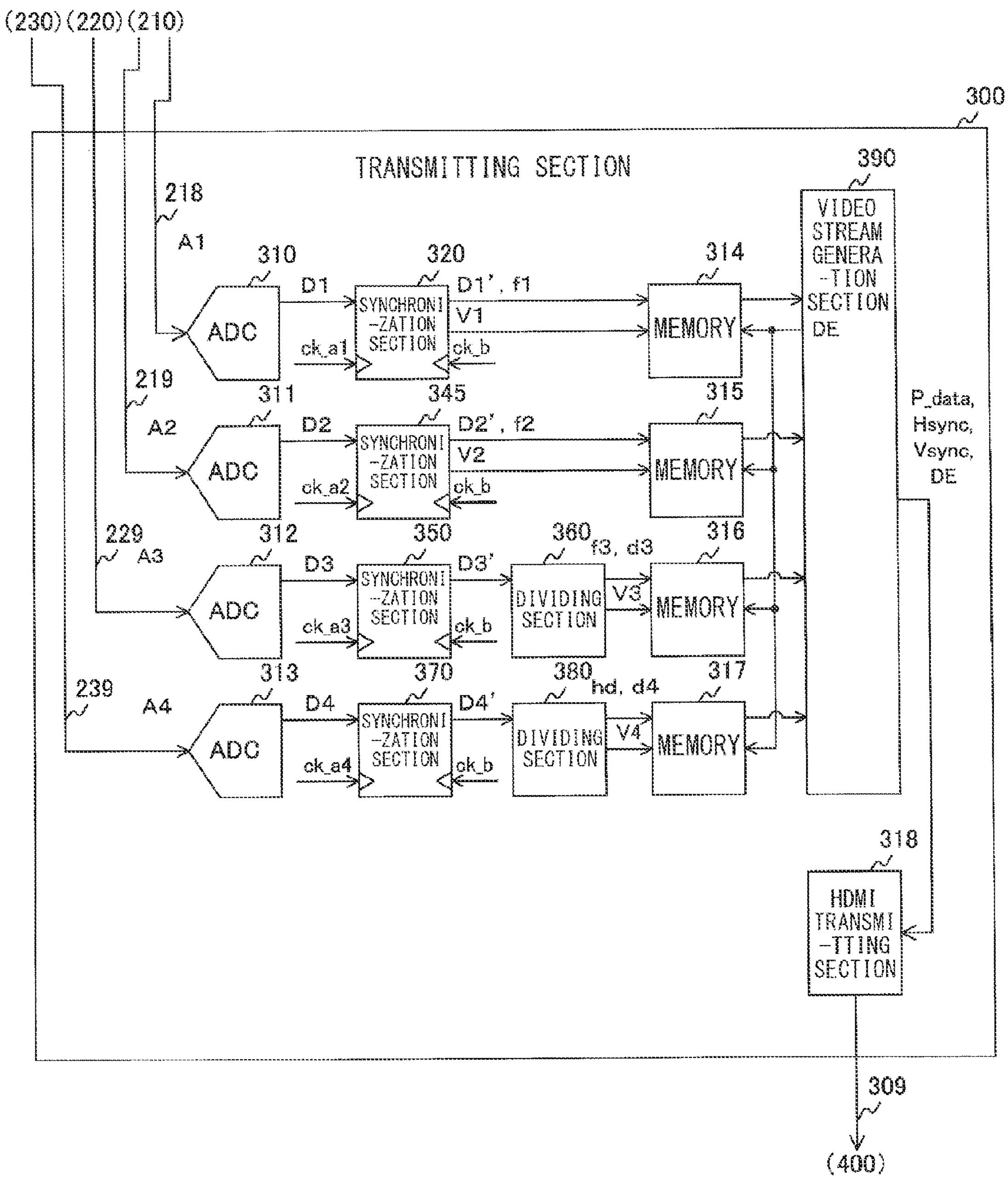
FIG. 2 is a block diagram illustrating a configuration example of a transmission section in the embodiment.

FIG. 2 is a block diagram illustrating a configuration example of the transmitting section 300 in the present embodiment. The transmitting section 300 includes ADCs (Analog to Digital Converters) 310, 311, 312, and 313, and synchronization sections 320, 345, 350, and 370. The transmitting section 300 includes dividing sections 360 and 380, memories 314, 315, 316, and 317, a video stream generation section 390, and an HDMI transmitting section 318.

The ADC 310 converts the analog data A1 into the digital data D1 in synchronization with a clock signal ck_a1. A clock frequency $F_{ck\_a1}$ of the clock signal ck_a1 corresponds to the sampling frequency that is used when A/D (Analog to Digital) conversion is performed on the analog data A1. The ADC 310 supplies the digital data D1 to the synchronization section 320. The ADC 311 converts the analog data A2 into the digital data D2 in synchronization with a clock signal ck_a2. A clock frequency $F_{ck\_a2}$ of the clock signal ck_a2 corresponds to the sampling frequency that is used when A/D conversion is performed on the analog data A2. The ADC 311 supplies the digital data D2 to the synchronization section 345. The ADC 312 converts the analog data A3 into the digital data D3 in synchronization with a clock signal ck_a3. A clock frequency $F_{ck\_a3}$ of the clock signal ck_a3 corresponds to the sampling frequency that is used when A/D conversion is performed on the analog data A3. The ADC 312 supplies the digital data D3 to the synchronization section 350. The ADC 313 converts the analog data A4 into the digital data D4 encoded with the use of a predetermined codec in synchronization with a clock signal ck_a4. A clock frequency $F_{ck\_a4}$ of the clock signal ck_a4 corresponds to the sampling frequency that is used when A/D conversion is performed on the analog data A4. The ADC 313 supplies the digital data D4 to the synchronization section 370.

In this example, the clock frequency $F_{ck\_a1}$ of the clock signal ck_a1 is the same as the clock frequency $F_{ck\_a2}$ of the clock signal ck_a2.

The clock frequency $F_{ck\_a3}$ of the clock signal ck_a3 is ½ of the clock frequency $F_{ck\_a1}$ or lower. Specifically, the clock frequency $F_{ck\_a3}$ may be about ¼ of the clock frequency $F_{ck\_a1}$. Therefore, it is possible to divide the digital data D3 into the number of pieces which is equal to or smaller than a value obtained by dividing the clock frequency $F_{ck\_a1}$ by the clock frequency $F_{ck\_a3}$ and to transmit the divided pieces of the digital data D3 together with the digital data D1. The clock frequency $F_{ck\_a4}$ of the clock signal ck_a4 is assumed as being 1/n (where "n" is a data size of the digital data D4) of the clock frequency $F_{ck\_a1}$ or smaller. Specifically, the clock frequency $F_{ck\_a4}$ may be about 1/192 of the clock frequency $F_{ck\_a1}$. Therefore, it is possible to divide the digital data D4 based on a bit unit and transmit the divided pieces of the digital data D4 together with the digital data D1.

It is to be noted that the ADCs 310 and 311 are specific but not limitative examples of "high-speed data supply section" of one embodiment of the present technology. The digital data D1 and D2 is a specific but not limitative example of "high-speed data" of one embodiment of the present technology. The ADCs 312 and 313 are specific but not limitative examples of "low-speed data supply section" of one embodiment of the present technology. The digital data D3 and D4 is a specific but not limitative example of "low-speed data" of one embodiment of the present technology.

In the present embodiment, the source device 100 performs A/D conversion. However, alternately, the source device 100 may acquire digital data which has been subjected to A/D conversion beforehand, for example, from an outside device, a recording medium, or the like. In this case, the source device 100 includes a digital data supply section instead of the ADC 310 and the like. The digital data supply section acquires the digital data D1 and the like from the outside device, the recording medium, etc., and supplies the acquired data to the synchronization section 320, the dividing section 360, and/or the like in synchronization with the clock signal ck_a1.

The synchronization section 320, 345, 350, and 370 transfer the digital data D1 to D4 onto a common clock signal ck_b, and thereby, allows the digital data D1 to D4 to synchronize with one another. A clock frequency $F_{ck\_b}$ of the clock signal ck_b is equal to or higher than the clock frequency $F_{ck\_a1}$. The clock signal ck_b may be, for example, a transfer clock of pixel data in HDMI.

A magnitude relationship between the above-described clock frequencies may be expressed, for example, by the following Expressions 1 to 3.

$$F_{ck\_a1}(=F_{ck\_a2}) \leq F_{ck\_b} < F_{ck\_a1} \times 2 \quad \text{(Expression 1)}$$

$$F_{ck\_a3} \times 4 \leq F_{ck\_b} < F_{ck\text{-}a3} \times 5 \quad \text{(Expression 2)}$$

$$F_{ck\_a4} \times 192 \leq F_{ck\_b} < F_{ck\_a4} \times 193 \quad \text{(Expression 3)}$$

In summary, the clock frequencies $F_{ck\_a1}$ and $F_{ck\_a2}$ are substantially the same as the clock frequency $F_{ck\_b}$, and the clock frequency $F_{ck\_a3}$ is about ¼ of the clock frequency $F_{ck\_b}$. The clock frequency $F_{ck\_a4}$ is about 1/192 of the clock frequency $F_{ck\_b}$.

The synchronization section 320 transfers the digital data D1 onto the clock signal ck_b. Further, the synchronization section 320 generates a flag f1 that indicates whether the digital data D1 is valid or not. The flag f1 may be set to a value of "1" when the digital data D1 is valid, and may be set to a value of "0" when the digital data D1 is invalid. The synchronization section 320 controls the memory 314 with the use of a memory control signal V1, and allows the memory 314 to hold the transferred digital data D1 as digital data D1' together with the flag f1.

The synchronization section 345 transfers the digital data D2 onto the clock signal ck_b. Further, the synchronization section 345 generates a flag f2 that indicates whether the digital data D2 is valid or not. The flag f2 may be set to a value of "1" when the digital data D2 is valid, and may be set to a value of "0" when the digital data D2 is invalid. The synchronization section 345 controls the memory 315 with the use of a memory control signal V2, and allows the memory 315 to hold the transferred digital data D2 as digital data D2' together with the flag f2.

It is to be noted that, in a configuration in which the ADC 310 performs A/D conversion with the use of the sampling frequency having a value same as that of the clock frequency $F_{ck\_b}$, the synchronization section 320 is not necessary. The same is applicable also to the synchronization section 345.

The synchronization section 350 transfers the digital data D3 onto the clock signal ck_b, and supplies the transferred digital data D3 to the dividing section 360 as digital data D3'.

The synchronization section 370 transfers the digital data D4 onto the clock signal ck_b, and supplies the transferred digital data D4 to the dividing section 380 as digital data D4'.

The dividing section 360 divides the digital data D3'. The dividing section 360 divides the digital data D3' into m-number of pieces (where "m" is an integer) of data. "m" is a value in accordance with a ratio of the clock frequency $F_{ck\_b}$ with respect to the clock frequency $F_{ck\_a3}$. The dividing section 360 sets each divided piece of data as digital data d3. Specifically, an integer not larger than a value obtained by dividing the clock frequency $F_{ck\_a3}$ by the clock frequency $F_{ck\_b}$ is set as the value of "m". For example, when the value obtained by dividing the clock frequency $F_{ck\_a3}$ by the clock frequency $F_{ck\_b}$ is about "4", "m" is set to "3". When "m" is set to "3" and the data size of the digital data D3' is, for example, 12 bits, the dividing section 360 generates three pieces of digital data d3 of 4 bits from one piece of digital data D3'.

Further, the dividing section 360 generates a flag f3 for each piece of digital data d3. The flag f3 indicates whether or not the piece of digital data d3 is a first piece of data. The "first piece of data" refers to a piece of digital data d3 that is to be transmitted first in a clock cycle of the clock signal ck_a3. The flag f3 may be set to a value of "1" when the piece of digital data d3 is the first data, and may be otherwise set to a value of "0". The dividing section 360 controls the memory 316 by the control signal V3, and allows the memory 316 to hold the digital data d3 and the flag f3.

The dividing section 380 divides the digital data D4'. The dividing section 380 divides the digital data D4 into n-number of pieces (where "n" is an integer) of data. "n" is a value in accordance with a ratio of the clock frequency $F_{ck\_b}$ with respect to the clock frequency $F_{ck\_a4}$. The dividing section 380 sets each divided piece of data as digital data d4. For example, when the data size of the digital data D4' is 22 bits, and "n" is set to "22", the dividing section 380 generates twenty-two pieces of digital data d4 of 1 bit from one piece of digital data D4. It is to be noted that the data size of the digital data D4 is not limited to 22 bits, and may be, for example, 16 bits, 24 bits, etc.

The dividing section 380 generates a header HD every time the digital data D4' is generated. The header HD is information indicating a timing to start transmission of the digital data D4', and may be, for example, data having a predetermined value and having a data size same as that of the digital data D4'. The value of the header HD is set to a value which is not allowed to be set for the digital data D4. For example, all of the bits in the header HD may be set to have a value of "1". The dividing section 380 controls the memory 317 with the use of a control signal V4, and allows the memory 317 to sequentially hold the bits hd ("1") in the headers HD. After allowing the memory 317 to hold all of the bits hd, the dividing section 380 allows the memory 317 to sequentially hold pieces of digital data d4.

The memory 314 holds the digital data D1' and the flag f1 in accordance with control by the synchronization section 320. The memory 315 holds the digital data D2' and the flag f2 in accordance with control by the synchronization section 345. The memory 316 holds the digital data d3 and the flag f3 in accordance with control by the dividing section 360. The memory 317 holds the bit hd in the header HD or the digital data d4 in accordance with the control by the dividing section 380.

The video stream generation section 390 generates a video stream in synchronization with the clock signal ck_b. The video stream includes a plurality of pieces of image data which are arranged in a time-series manner, a synchronization signal, and a data enable signal DE. Each piece of image data is configured of the predetermined number of pieces of pixel data P_data. The data size of the pixel data P_data is a data size defined as a data size of pixel data which is transferable in the HDMI standard, and may be, for example, one of 24 bits, 30 bits, 36 bits, and 48 bits.

The synchronization signal includes a vertical synchronous signal Vsync and a horizontal synchronous signal Hsync. The vertical synchronous signal Vsync is for allowing scanning timings of the image data in a vertical direction to synchronize with one another. The horizontal synchronous signal Vsync is for allowing scanning timings of the image data in a horizontal direction to synchronize with one another. The data enable signal DE is a signal that indicates a period for reproducing the image data. The data enable signal DE may be set at a high level during the period for reproducing the image data, and may be set to a low level during a period other than the period for reproducing the image data.

The video stream generation section 390 reads data from the memories 314 to 317 in synchronization with the clock signal ck_b in the period in which the data enable signal DE is set at the high level. Specifically, the video stream generation section 390 reads the digital data D1' and the flag f1 from the memory 314, and reads the digital data D2' and the flag f2 from the memory 315. The video stream generation section 390 reads the digital data d3 and the flag f3 from the memory 316, and reads the bit hd or the digital data d4 from the memory 317. The video stream generation section 390 generates pixel data P_data having a minimum size of the data sizes determined in HDMI that is larger than the total size of the read high-speed data (D1' and D2'), the low-speed data (d3 and d4), and the like. For example, when the total size of the relatively-high-speed data D1' and D2' is 22 bits, the total size of the low-speed data d3 and d4 is 5 bits, and the total size of the flags f1 to f3 is 3 bits, the total size of the data is 30 bits. Therefore, 30 bits out of 24 bits, 30 bits, 36 bits, 48 bits, etc. which are the sizes of the pixel data determined in HDMI is used as the size of the pixel data P_data. The video stream generation section 390 stores the high-speed data, the low-speed data, and the flags in the pixel data P_data.

However, when the digital data D1' is not stored in the memory 314, the video stream generation section 390 stores any data having a size same as that of the digital data D1' as invalid data in the pixel data P_data. In this case, the video stream generation section 390 generates the flag f1 that is set to a value of "0" which indicates invalid data and stores the generated flag f1 in the pixel data P_data. Also when the digital data D2' or d3 is not held by the memory 315 or 316, the flag f2 or f3 which is set to "0" is stored in the pixel data P_data together with invalid data in a similar manner. When both of the bit hd and the digital data d4 are not held by the memory 317, only invalid data (for example, a bit having a value of "0") is stored in the pixel data P_data.

When a total size of the digital data D1' (the luminance signal) and the digital data D2' (the color-difference signal) is 22 bits, a minimum size of pixel data that is capable of storing those digital data D1' and D2' is 24 bits. When transmitting only one image signal (for example, the digital data D1' and D2'), the video stream generation section 390 may use the pixel data of 24 bits. However, if the video stream generation section 390 uses pixel data larger than 24 bits (for example, 30 bits), signals other than the digital data D1' and D2' are allowed to be additionally included in the pixel data. If the video stream generation section 390 tries to add the digital data D3' and D4' as it is in the pixel data without dividing the digital data D3' and D4', a total size may not fit into the size of 30 bits. Therefore, the dividing sections 360 and 380 divide the digital data D3' and D4', respectively, so that all the data are allowed to be stored in the pixel data. Accordingly, the source device 100 is allowed to store the high-speed signals (such as D1' and D2') and the low-speed signals (such as D3' and D4') in pixel data having a defined data size and to transmit the signals. Therefore, the source device 100 is allowed to transmit the plurality of signals via one cable.

The HDMI transmitting section 318 transmits a video stream to the sink device 400 in accordance with the HDMI standard. In the HDMI standard, data is transmitted in a TMDS (Transmission Minimized Differential Signaling) scheme. In the TMDS scheme, three pairs of signal lines for transmitting pixel data and a pair of signal lines for transmitting clock signals are used to determine a value of a signal based on a potential difference between the pair of signal lines.

It is to be noted that the video stream generation section 390 and the HDMI transmitting section 318 are specific but not limitative examples of "data transmitting section" in one embodiment of the present technology.

The data sizes of the digital data D1, D2, and D3 are not limited to the above-described examples as with the data size of the digital data D4. The data size of the digital data D1 which indicates luminance may be other than 12 bits, for example, may be 10 bits. The same is applicable to the data sizes of the digital data D2 and D3.

[Configuration Example of Synchronization Section]

Figure 3:
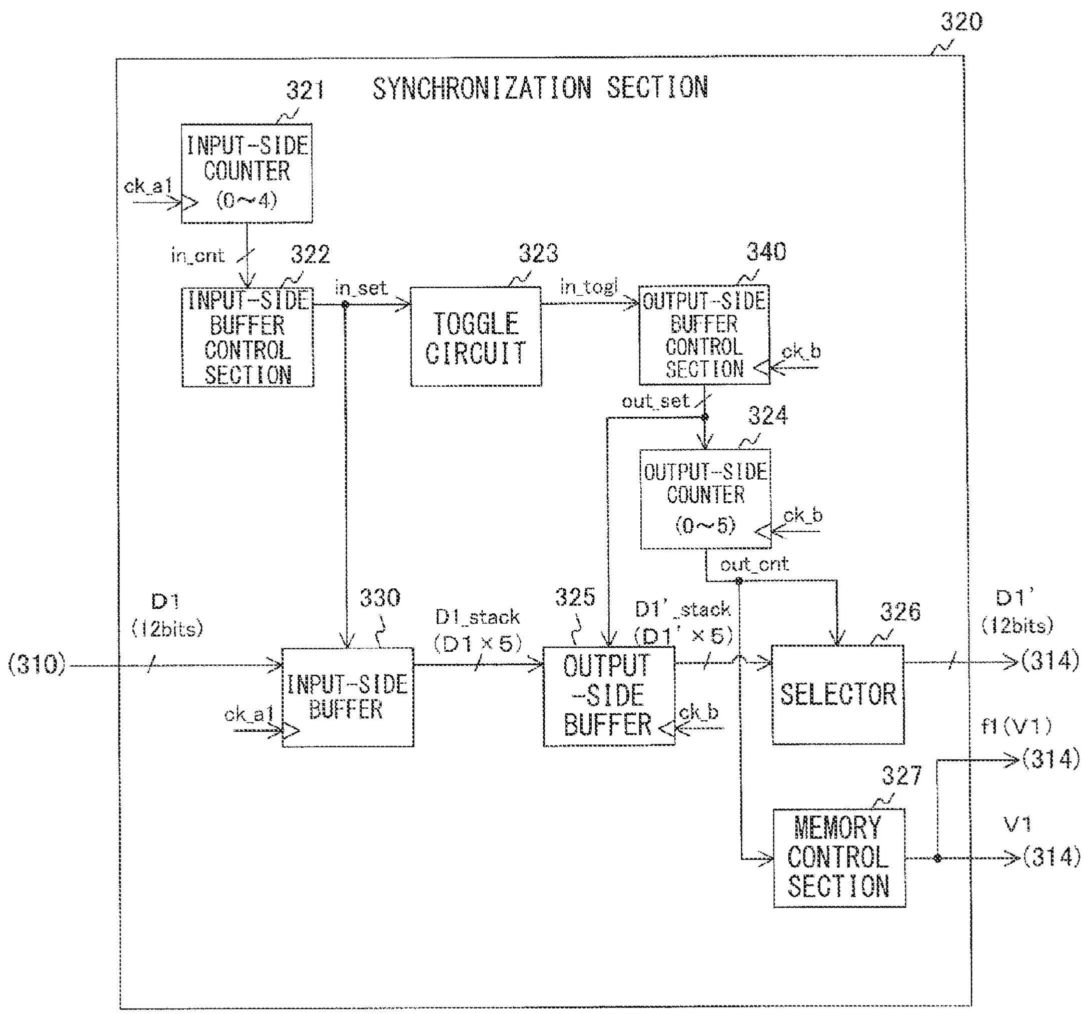
FIG. 3 is a block diagram illustrating a configuration example of a synchronization section in the embodiment.

FIG. 3 is a block diagram illustrating a configuration example of the synchronization section 320 in the present embodiment. The synchronization section 320 includes an input-side counter 321, an input-side buffer control section 322, a toggle circuit 323, an output-side counter 324, an output-side buffer 325, a selector 326, and a memory control section 327. Further, the synchronization section 320 includes an input-side buffer 330 and an output-side buffer control section 340.

The input-side counter 321 counts numerical values in synchronization with the clock signal ck_a1. The input-side counter 321 may repeatedly count numerical values from 0 to 4 in synchronization with the clock signal ck_a1. The input-side counter 321 supplies the counted value as a count value in_cnt to the input-side buffer control section 322.

The input-side buffer control section 322 controls the input-side buffer 330. The input-side buffer control section 322 generates, based on the count value in_cnt, an input-side set signal in_set, and supplies the generated input-side set signal in_set to the input-side buffer 330 and to the toggle circuit 323. The input-side set signal in_set is a signal instructing a timing to hold a predetermined number of (for example, five) pieces of digital data D1 in the input-side buffer 330. Specifically, the input-side buffer control section 322 generates the input-side set signal in_set when the count value in_cnt becomes a predetermined value (for example, "4").

The input-side buffer 330 holds the digital data D1 in accordance with control by the input-side buffer control section 322. The input-side buffer 330 includes a plurality of stages of registers that operate in accordance with the clock signal ck_a1. When the input-side set signal in_set is supplied, the register of a last stage holds the digital data D1 supplied from the ADC 310 and the digital data D1 supplied from each register. When the number of stages of the registers is five, the register of the last stage holds five pieces of digital data D1. The input-side buffer 330 outputs the data as stack data D1_stack to the output-side buffer 325.

The toggle circuit 323 inverts a value of a toggle signal in_togl in accordance with the input-side set signal in_set. Every time the input-side set signal in_set is supplied to the toggle circuit 323, the toggle circuit 323 may inverts the value of the toggle signal in_togl and supplies the inverted value to the output-side buffer control section 340.

The output-side buffer control section 340 controls the output-side buffer 325. The output-side buffer control section 340 generates, based on the toggle signal in_togl, an output-side set signal out_set, and supplies the generated output-side set signal out_set to the output-side buffer 325 and to the output-side counter 324. The output-side set signal out_set is a signal instructing a timing for the output-side buffer 325 to hold stack data D1_stack. Detailed description will be provided later on a method of generating the output-side set signal out_set.

The output-side counter 324 counts numerical values in synchronization with the clock signal ck_b. The output-side counter 324 counts up numerical values from an initial value (for example, "0") in synchronization with the clock signal ck_b. When the counted value is a predetermined value (for example, "5"), that value is held. Also, the output-side counter 324 sets the counted value to the initial value when the output-side set signal out_set is supplied thereto. The output-side counter 324 supplies the counted value as a count value out_cnt to the selector 326 and to the memory control section 327.

The output-side buffer 325 holds stack data D1_stack in accordance with control by the output-side buffer control section 340. When the output-side set signal out_set is supplied, the output-side buffer 325 holds the stack data D1_stack as stack data D1'_stack configured of five pieces of digital data D1'. The stack data D1'_stack is data transferred onto the clock signal ck_b from the clock signal ck_a1.

The selector 326 selects, based on the count value out_cnt, any piece of digital data D1' in the stack data D1'_stack, and supplies the selected piece of digital data D1' to the memory 314. Specifically, the selector 326 selects an i-th piece of digital data D1' out of the five pieces of digital data D1' when the count value out_cnt is "i". It is to be noted that the selector 326 selects the fourth piece of digital data D1' when the count value out_cnt is "5".

The memory control section 327 controls the memory 314. The memory control section 327 generates, based on the count value out_cnt, a memory control signal V1, and supplies the generated memory control signal V1 to the memory 314. The memory control signal V1 is a signal instructing a timing for the memory 314 to hold the data, and is set at a high level at the timing of holding the data. Specifically, the memory control section 327 sets the memory control signal V1 at a low level when the count value out_cnt becomes a predetermined value (for example, "5"), and otherwise sets the memory control signal V1 at the high level in other cases. The memory control signal V1 is held by the memory 314 as the flag f1.

Figure 4:
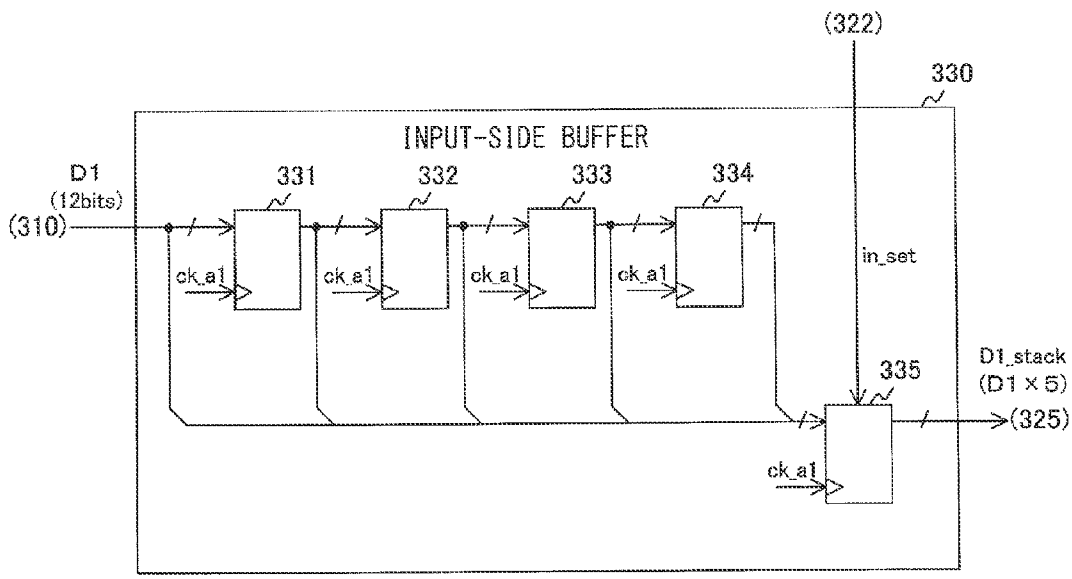
FIG. 4 is a block diagram illustrating a configuration example of an input-side buffer in the embodiment.

FIG. 4 is a block diagram illustrating a configuration example of the input-side buffer 330 in the present embodiment. The input-side buffer 330 includes registers 331, 332, 333, 334, and 335.

The register 331 holds the digital data D1 supplied from the ADC 310 in synchronization with the clock signal ck_a1. The register 331 supplies the held digital data D1 to the registers 332 and 335. The register 332 holds the digital data D1 supplied from the register 331 in synchronization with the clock signal ck_a1. The register 332 supplies the held digital data D1 to the registers 333 and 335.

The register 333 holds the digital data D1 supplied from the register 332 in synchronization with the clock signal ck_a1. The register 333 supplies the held digital data D1 to the registers 334 and 335. The register 334 holds the digital data D1 supplied from the register 333 in synchronization with the clock signal ck_a1. The register 334 supplies the held digital data D1 to the register 335.

The register 335 holds the digital data D1 supplied from the ADC 310 and four pieces of digital data D1 supplied from the registers 331 to 334 when the input-side set signal in_set is supplied to the register 335. The register 335 supplies the five pieces of digital data D1 held by the register 335 as stack data D 1_stack to the output-side buffer 325.

[Configuration Example of Output-side Buffer Control Section]

Figure 5:
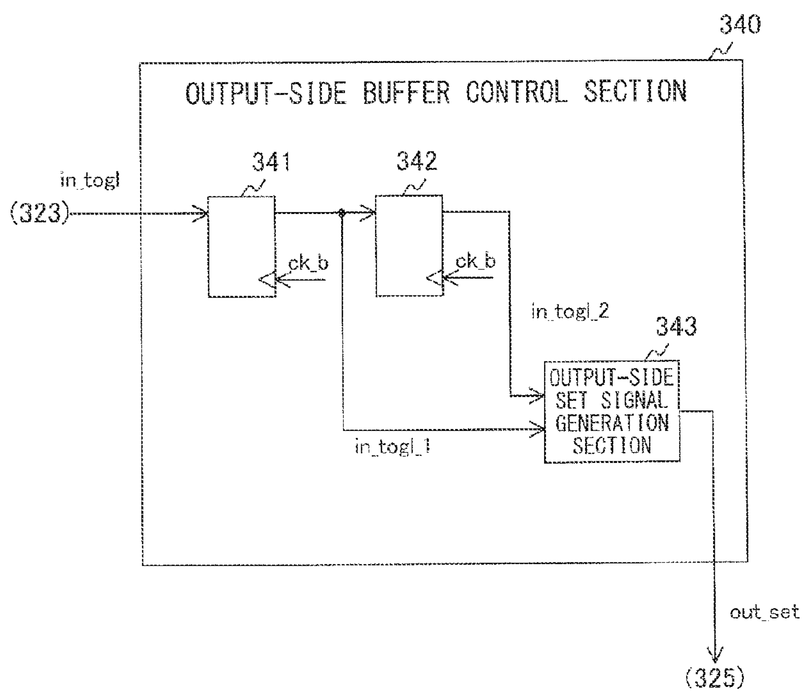
FIG. 5 is a block diagram illustrating an output-side buffer control section in the embodiment.

FIG. 5 is a block diagram illustrating a configuration example of the output-side buffer control section 340 in the present embodiment. The output-side buffer control section 340 includes flip-flops 341 and 342 and an output-side set signal generation section 343.

The flip-flop 341 holds the toggle signal in_togl in synchronization with the clock signal ck_b. The flip-flop 341 supplies the held toggle signal in_togl as a toggle signal in_togl_1 to the flip-flop 342 and to the output-side set signal generation section 343.

The flip-flop 342 holds the toggle signal in_togl_1 in synchronization with the clock signal ck_b. The flip-flop 342 supplies the held toggle signal in_togl_1 as a toggle signal in_togl_2 to the output-side set signal generation section 343.

The output-side set signal generation section 343 generates an output-side set signal out_set, based on the toggle signal in_togl_1 and the toggle signal in_togl_2. Specifically, the output-side set signal generation section 343 asserts the output-side set signal out_set when either the toggle signal in_togl_1 or the toggle signal in_togl_2 is at a high level. On the other hand, the output-side set signal generation section 343 negates the output-side set signal out_set when both of the toggle signal in_togl_1 and the toggle signal in_togl_2 are at the high level or at the low level. The output-side set signal generation section 343 supplies the output-side set signal out_set to the output-side buffer 325.

FIG. 6 is a diagram illustrating an example of an operation of the outside-set signal generation section 343 in the present embodiment. The output-side set signal generation section 343 asserts the output-side set signal out_set when either the toggle signal in_togl_1 or the toggle signal in_togl_2 is at the high level. On the other hand, the output-side set signal generation section 343 negates the output-side set signal out_set when both of the toggle signal in_togl_1 and the toggle signal in_togl_2 are at the high level or at the low level.

FIG. 7 is a diagram illustrating an example of an operation of the output-side counter 324 in the present embodiment. The output-side counter 324 counts up numerical values from an initial value (for example, "0") when the output-side set signal out_set is at the low level and the clock signal ck_b is at the high level. When the counted value is a predetermined value (for example, "5"), that value is held. Also, the output-side counter 324 sets the counted value to the initial value when the output-side set signal out_set and the clock signal ck_b become at the high level.

[Configuration Example of Synchronization Section and Dividing Section]

Figure 8:
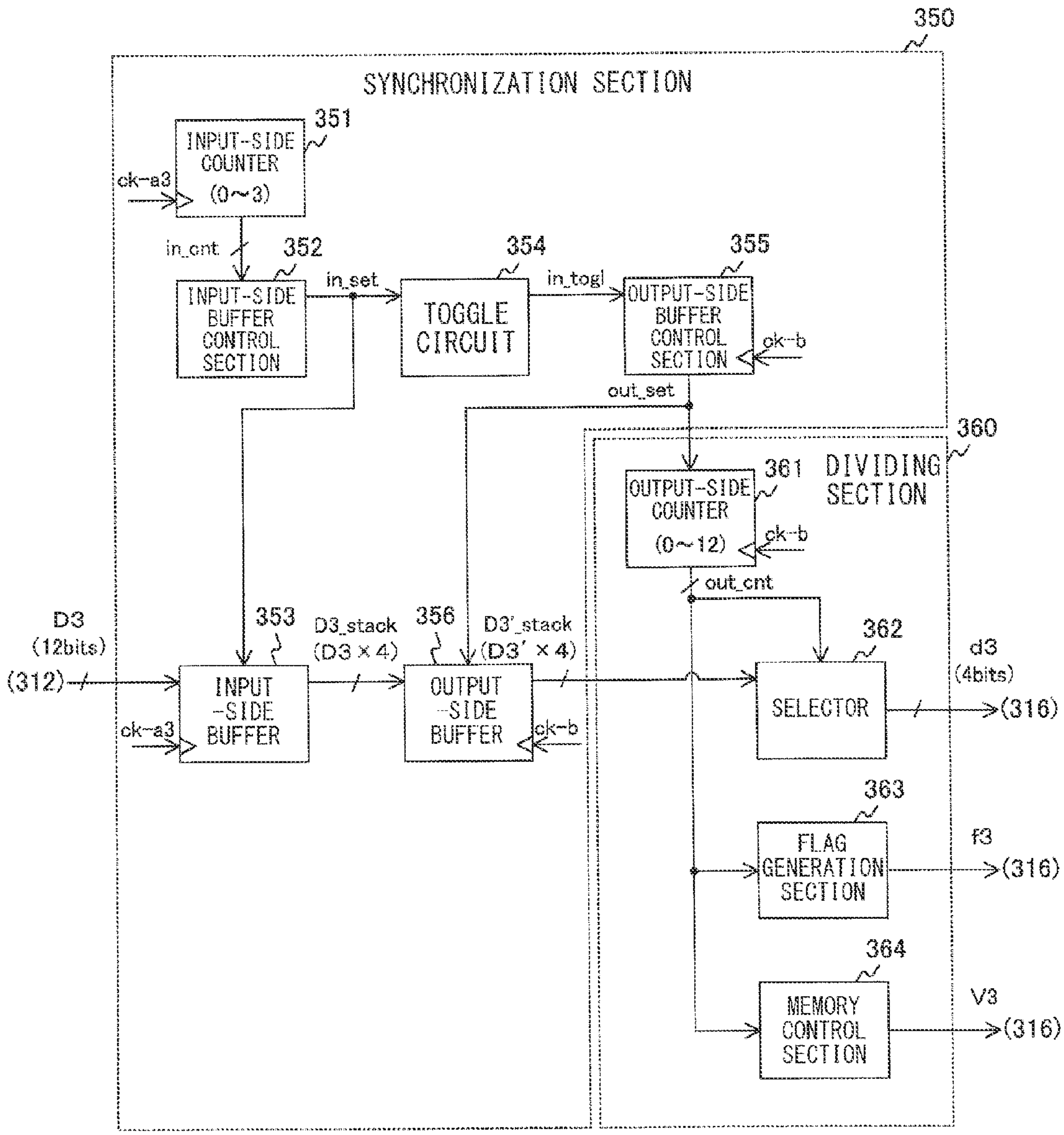
FIG. 8 is a block diagram illustrating a configuration example of a synchronization section and a dividing section for an intermediate frequency signal in the embodiment.

FIG. 8 is a block diagram illustrating a configuration example of the synchronization section 350 and the dividing section 360 for an intermediate frequency signal in the present embodiment. The synchronization section 350 includes an input-side counter 351, an input-side buffer control section 352, an input-side buffer 353, a toggle circuit 354, an output-side buffer control section 355, and an output-side buffer 356.

The configuration of the input-side counter 351 is similar to that of the input-side counter 321 except that the input-side counter 351 counts numerical values from 0 to 3 instead of from 0 to 4.

The configurations of the input-side buffer control section 352, the toggle circuit 354, and the output-side buffer control section 355 are similar to those of the input-side buffer control section 322, the toggle circuit 323, and the output-side buffer control section 340, respectively.

The configuration of the input-side buffer 353 is similar to that of the input-side buffer 330 except that the number of stages of registers is four. The input-side buffer 353 supplies four pieces of digital data D3 as stack data D3_stack to the output-side buffer 356.

The configuration of the output-side buffer 356 is similar to that of the output-side buffer 325. However, the output-side buffer 356 holds the stack data D3_stack as stack data D3'_stack configured of four pieces of digital data D3'. The stack data D3'_stack is divided into twelve pieces of digital data d3 to be read.

The dividing section 360 includes an output-side counter 361, a selector 362, a flag generation section 363, and a memory control section 364.

The configuration of the output-side counter 361 is similar to that of the output-side counter 324 except that the output-side counter 361 counts numerical values from 0 to 12 instead of from 0 to 5.

The selector 362 selects, based on the count value out_cnt, any piece of digital data d3 in the stack data D3'_stack, and supplies the selected piece of digital data d3 to the memory 316. Specifically, the selector 362 selects a j-th piece of digital data d3 out of the twelve pieces of digital data d3 when the count value out_cnt is "j". It is to be noted that the selector 362 selects the eleventh piece of digital data d3 when the count value out_cnt is "12".

The flag generation section 363 generates a flag f3 based on the count value out_cnt. Specifically, the flag generation section 363 generates a flag f3 set at a high level when the count value out_cnt is any of 0, 3, 6, and 9. On the other hand, the flag generation section 363 generates the flag f3 set at a low level when the count value out_cnt is none of 0, 3, 6, and 9.

The configuration of the memory control section 364 is different from that of the memory control section 327 in that the memory control section 364 sets a memory control signal V3 at a low level when the count value out_cnt becomes "12" and in that the memory control section 364 does not supply the memory control signal V3 as a flag.

Figure 9:
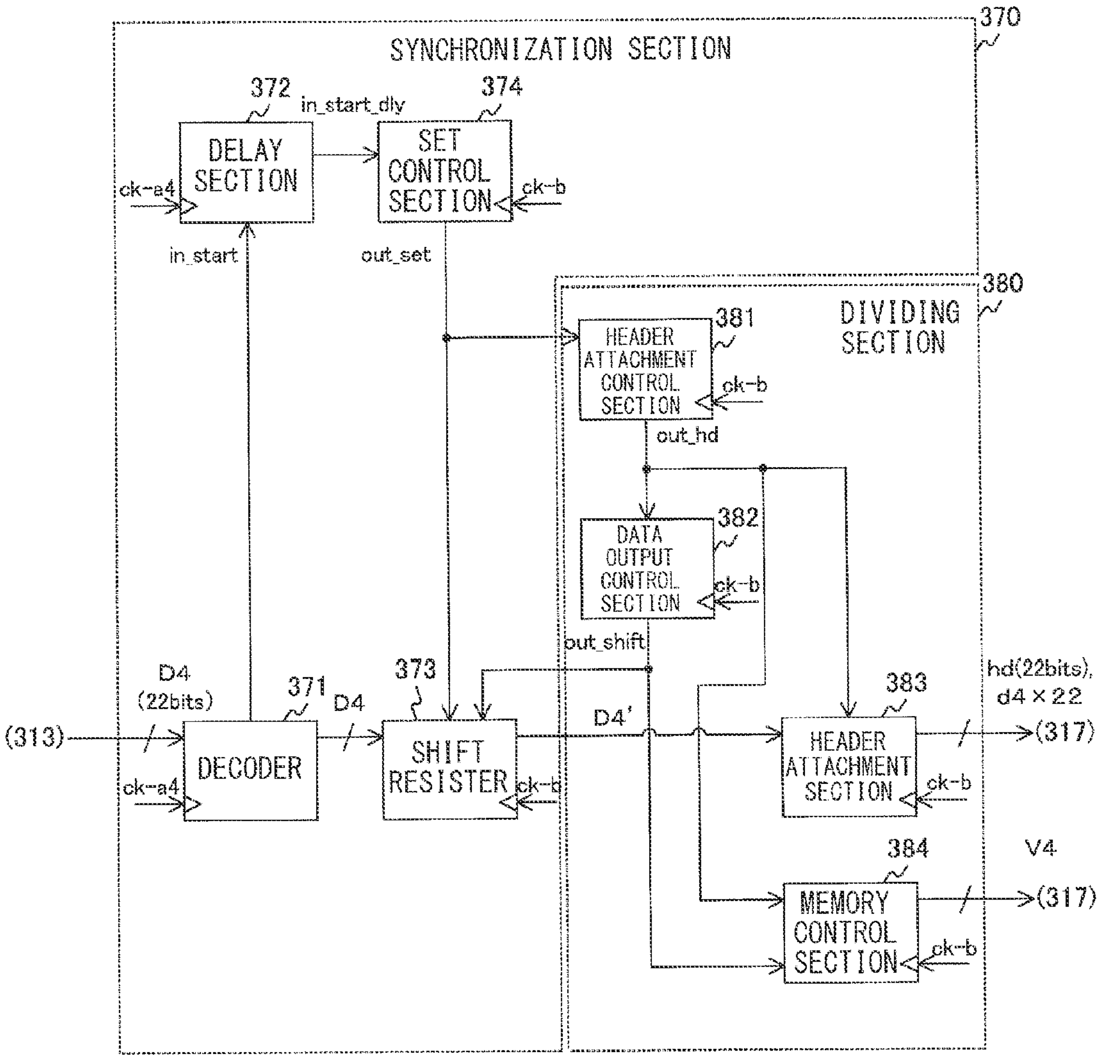
FIG. 9 is a block diagram illustrating a configuration example of a synchronization section and a dividing section for an audio signal in the embodiment.

FIG. 9 is a block diagram illustrating a configuration example of the synchronization section 370 and the dividing section 380 for an audio signal in the present embodiment.

The synchronization section 370 includes a decoder 371, a delay section 372, a shift register 373, and a set control section 374. Further, the dividing section 380 includes a header attachment control section 381, a data output control section 382, a header attachment section 383, and a memory control section 384.

The decoder 371 decodes the digital data D4. The decoder 371 may, for example, acquire each bit of the digital data D4 based on a bit clock and decode the acquired bit of data in accordance with a predetermined codec. The bit clock is not illustrated in FIG. 9. The decoder 371 supplies the decoded digital data D4 to the shift register 373 in synchronization with the clock signal ck_a4. Also, every time the decoder 371 decodes the digital data D4, the decoder 371 generates a start signal in_start and supplies to the delay section 372. The start signal in_start is a signal that indicates a transmitting timing of valid digital data D4.

In this example, the digital data D4 may be data from only one of L (left) channel and R (right) channel, for example. However, the decoder 371 may acquire data from both the L channel and the R channel as the digital data D4. In this case, the decoder 371 further receives an LR clock that indicates whether the acquired data is the L-channel data or the R-channel data.

The delay section 372 delays the start signal in_start for a certain period in synchronization with the clock signal ck_a4. The delay section 372 supplies the delayed start signal in_start as a start signal in_start_dly to the set control section 374.

The set control section 374 controls the shift register 373 and allows the shift register 373 to hold data. In synchronization with the clock signal ck_b, the set control section 374 detects a rising edge of the start signal in_start_dly and generates the output-side set signal out_set. For example, the set control section 374 includes two stages of flip-flops and a logic circuit as with the output-side buffer control section 340 as exemplified in FIG. 5. The flip-flop of the first stage holds the start signal in_start_dly in synchronization with the clock signal ck_b, and outputs the held signal as a start signal in_start_dly_1. The flip-flop of the second stage holds the start signal in_start_dly_1 in synchronization with the clock signal ck_b, and outputs the held signal as a start signal in_start_dly_2. The logic circuit in the set control section 374 asserts an output-side set signal out_set when the start signal in_start_dly_1 is at a high level and the start signal in_start_dly_2 is at a low level (when a rising edge is detected). The logic circuit otherwise negates the output-side set signal out_set. The set control section 374 supplies the output-side set signal out_set to the shift register 373 and the header attachment control section 381. The output-side set signal out_set is a signal that instructs a timing for the shift register 373 to hold the digital data D4.

The header attachment control section 381 controls the header attachment section 383. The header attachment control section 381 generates a header attachment control signal out_hd and supplies the generated header attachment control signal out_hd to the data output control section 382, the header attachment section 383, and the memory control section 384, when the output-side set signal out_set is supplied. The header attachment control signal out_hd is a signal that instructs a timing to attach a header HD.

The data output control section 382 controls an output operation of the shift register 373. The data output control section 382 generates a shift control signal out_shift and supplies the generated shift control signal out_shift to the shift register 373 and the memory control section 384 after the header attachment control signal out_hd is supplied. The shift control signal out_shift is a signal that instructs, to the shift resister 373, output of the digital data d4.

The shift register 373 holds the digital data D4, and sequentially outputs the respective bits of the held digital data D4 (i.e., the respective pieces of digital data d4). The shift register 373 includes at least n-number of stages of flip-flops. In this example, "n" is a value of the data size of the digital data D4. The shift register 373 holds the digital data D4 supplied from the decoder 371 as digital data D4' when the output-side set signal out_set is supplied. Further, when the shift control signal out_shift is supplied, the shift register 373 shifts the digital data d4 in the digital data D4' in synchronization with the clock signal ck_b. Further, the shift register 373 sequentially supplies the respective pieces of digital data d4 to the header attachment section 383 from the n-number of stages of flip-flops.

The header attachment section 383 generates a header HD and attaches the generated header HD to the digital data D4'. The header attachment section 383 generates, when the header attachment control signal out_hd is supplied, a header HD, and sequentially supplies the respective bits hd of the generated header HD to the memory 317 in synchronization with the clock signal ck_b. Also, the header attachment section 383 sequentially supplies the respective pieces of digital data d4 supplied from the shift register 373 to the memory 317 in synchronization with the clock signal ck_b after transmitting the header HD.

The memory control section 384 controls the memory 317. The memory control section 384 generates, based on the header attachment control signal out_hd and the shift control signal out_shift, a memory control signal V4, and supplies the generated memory control signal V4 to the memory 314. The memory control signal V4 is a signal that instructs a timing for the memory 317 to hold data, and is set at a high level at the timing for holding the data. Specifically, the memory control section 384 sets the memory control signal V4 at the high level when the header attachment control signal out_hd or the shift control signal out_shift is supplied thereto, and sets the memory control signal V4 at a low level when neither the header attachment control signal out_hd nor the shift control signal out_shift is supplied thereto.

FIG. 10 illustrates an example of an operation of the shift register 373 in the present embodiment. The shift register 373 holds the digital data D4' when the output-side set signal out_set is at the high level. Also, the shift register 373 sequentially outputs the respective bits of the digital data D4' (i.e., the respective pieces of digital data d4) in synchronization with the clock signal ck_b when the shift control signal out_shift is at the high level. In this example, it is assumed that not both the output-signal set signal out_set and the shift control signal out_shift are set at the high level.

Figure 11:
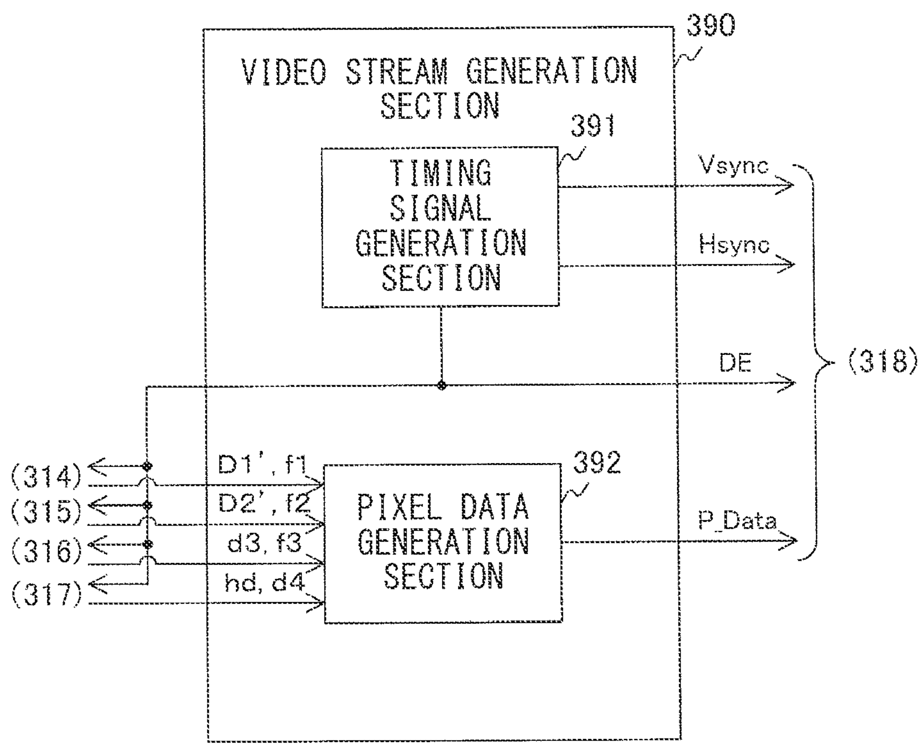
FIG. 11 is a diagram illustrating an example of a video stream generation section in the embodiment.

FIG. 11 illustrates an example of the video stream generation section 390 in the present embodiment. The video stream generation section 390 includes a timing signal generation section 391 and a pixel data generation section 392.

The timing signal generation section 391 generates the vertical synchronous signal Vsync, the horizontal synchronous signal Hsync, and the data enable signal DE. The timing signal generation section 391 generates the vertical synchronous signal Vsync, the horizontal synchronous signal Hsync, and the data enable signal DE at timings defined in HDMI in synchronization with the clock signal ck_b. The timing signal generation section 391 supplies the generated vertical synchronous signal Vsync, the horizontal synchronous signal Hsync, and the data enable signal DE to the HDMI transmitting section 318. Also, the timing signal generation section 391 supplies the data enable signal DE as signals for controlling the memories 314 to 317 to the memories 314 to 317. For example, the timing signal generation section 391 supplies, to the memories 314 to 317, the data enable signals DE at the high level as signals that instruct to output the held data.

The pixel data generation section 392 generates pixel data P_data. The pixel data generation section 392 reads data from the memories 314 to 317 in synchronization with the clock signal ck_b. The pixel data generation section 392 generates the pixel data P_data having a predetermined region in which the read data is stored and supplies the generated pixel data P_data to the HDMI transmitting section 318.

Figure 12:
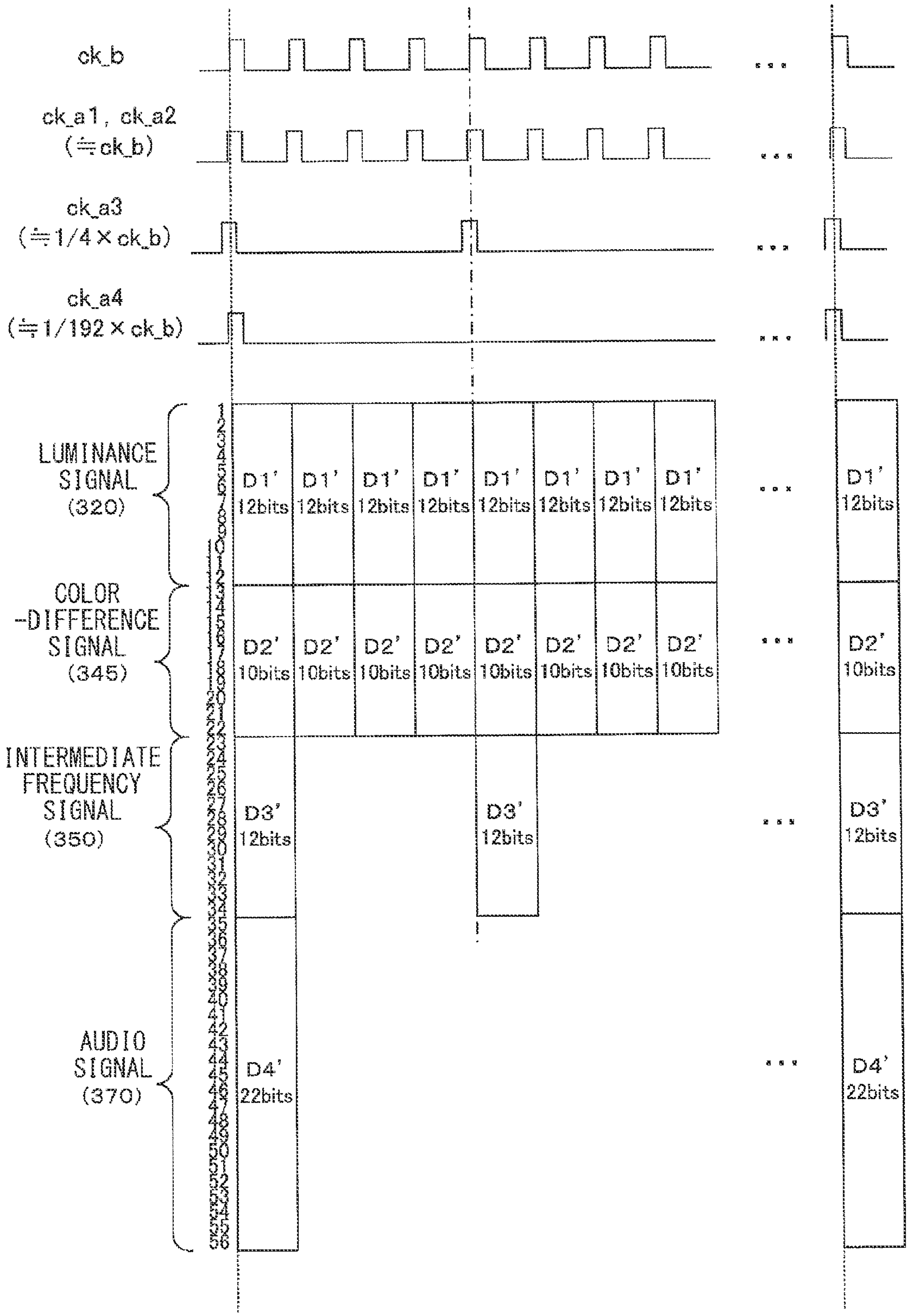
FIG. 12 is a diagram illustrating an example of synchronized data in the embodiment.

FIG. 12 illustrates an example of synchronized data in the present embodiment. The clock signal ck_a1 satisfies Expression 1, and has a clock frequency about the same as that of the clock signal ck_b. Therefore, the digital data D1 generated in synchronization with the clock signal ck_a1 is outputted as digital data D1' from the synchronization section 320 every time the clock signal ck_b rises. The same is applicable to the digital data D2.

The clock signal ck_a3 satisfies Expression 2, and has a clock frequency that is about ¼ of that of the clock signal ck_b. Therefore, the digital data D3 generated in synchronization with the clock signal ck_a3 is outputted as digital data D3' from the synchronization section 350 for about every four clocks of the clock signal ck_b.

The clock signal ck_a4 satisfies Expression 3, and has a clock frequency that is about 1/192 of that of the clock signal ck_b. Therefore, the digital data D4 generated in synchronization with the clock signal ck_a4 is outputted as digital data D4' from the synchronization section 370 for about every hundred-and-ninety-two clocks of the clock signal ck_b.

An example is assumed here where each data size of the digital data D1', D2', D3', and D4' may be, for example, 12 bits, 10 bits, 12 bits, and 22 bits, respectively. In this case, the total size of the data to be transmitted is 56 bits at a timing when the above-described data is outputted at the same time. Therefore, the data to be transmitted is not storable in pixel data having a size defined in HDMI. Therefore, it is necessary to divide the digital data D3' and the digital data D4' that are at relatively-low speed.

Figure 13:
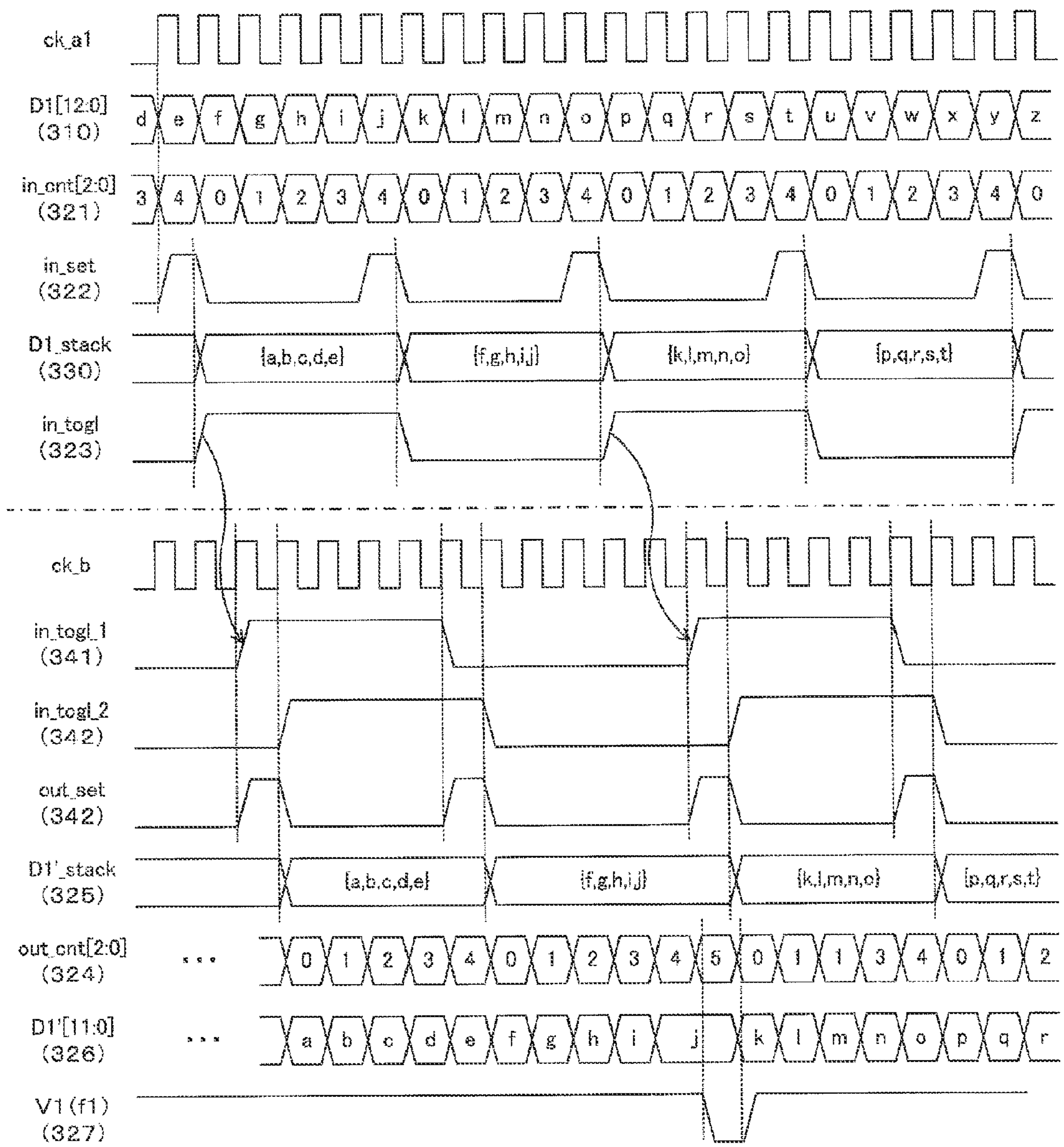
FIG. 13 is a timing chart illustrating an example of an operation of the synchronization section in the embodiment.

FIG. 13 is a timing chart illustrating an example of an operation of the synchronization section 320 in the present embodiment.

The ADC 310 generates the digital data D1 in synchronization with the clock signal ck_a1. The input-side counter 321 counts the count values in_cnt from 0 to 4 in synchronization with the clock signal ck_a1. The input-side buffer control section 322 generates the input-side set signal in_set when the count value in_cnt becomes "4". When the input-side set signal in_set is generated, the input-side buffer 330 holds five pieces of digital data D1 as stack data D1_stack. The toggle circuit 323 inverts the value of the toggle signal in_togl every time the input-side set signal in_set is generated.

The flip-flop 341 holds the toggle signal in_togl in synchronization with the clock signal ck_b, and supplies the held toggle signal in_togl as a toggle signal in_togl_1. The flip-flop 342 holds the toggle signal in_togl_1 in synchronization with the clock signal ck_b and supplies the held toggle signal in_togl_1 as a toggle signal in_togl_2. The output-side set signal generation section 343 asserts the output-side set signal out_set when either of the toggle signal in_togl_1 or the toggle signal in_togl_2 is at the high level.

When the output-side set signal out_set is asserted, the output-side buffer 325 holds the stack data D1_stack as stack data D1'_stack configured of five pieces of digital data D1'. Thus, the digital data D1 is transferred onto the clock signal ck_b.

The output-side counter 324 counts up the count values out_cnt from the initial value (for example, "0") in synchronization with the clock signal ck_b. It is to be noted that, when the count value out_cnt is "5", that value is held. The output-side counter 324 sets the count value out_cnt to the initial value when the output-side set signal out_set is supplied.

The selector 326 selects any piece of digital data D1' in the stack data D1'_stack, based on the count value out_cnt. It is to be noted that the selector 326 selects the fourth piece of digital data D1' when the count value out_cnt is "5".

The memory control section 327 sets the memory control signal V1 at the low level when the count value out_cnt becomes a predetermined value (for example, "5"), and otherwise sets the memory control signal V1 at the high level. The memory control signal V1 is held by the memory 314 as the flag f1.

Figure 14:
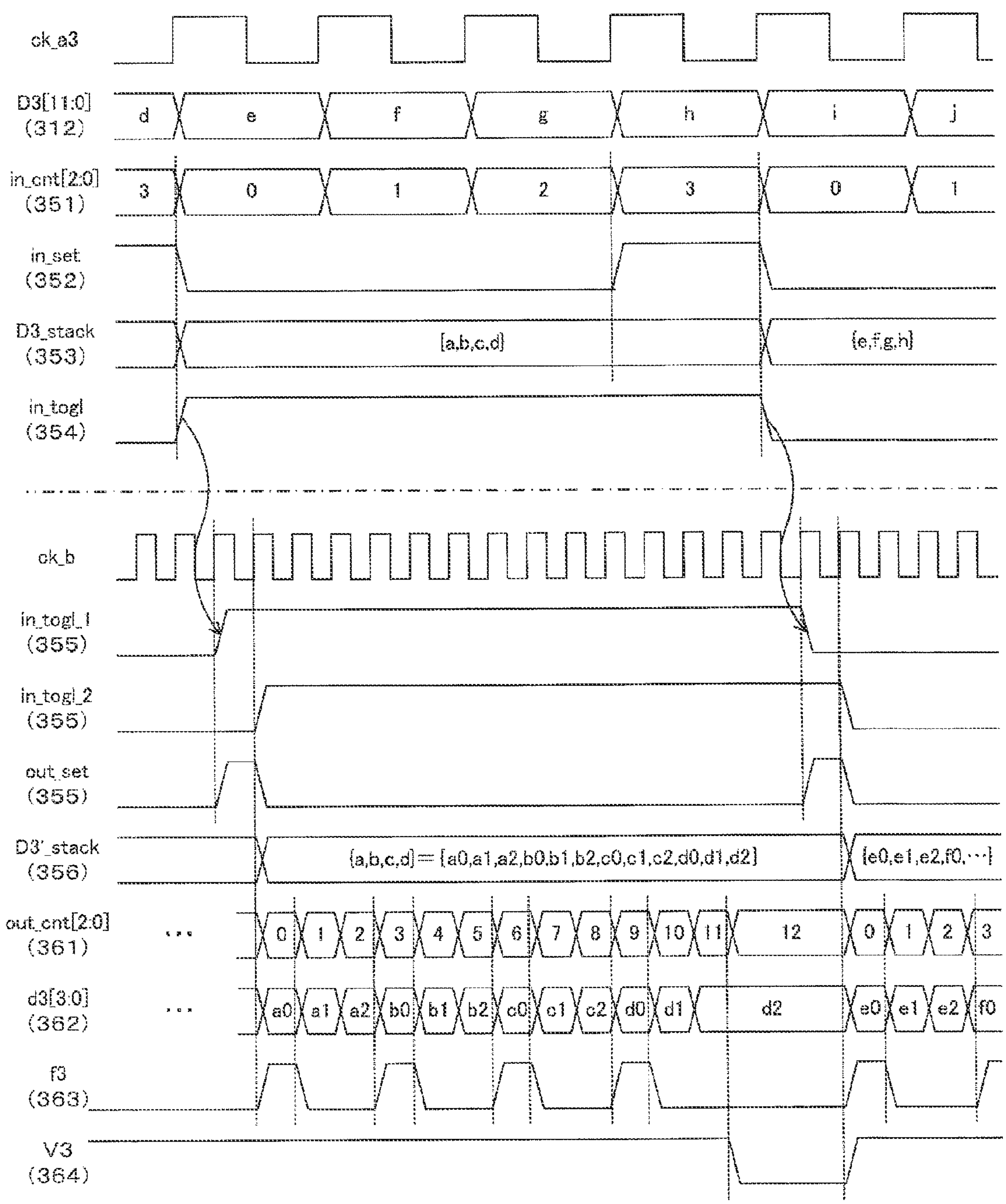
FIG. 14 is a timing chart illustrating an example of an operation of the synchronization section and the dividing section for the intermediate frequency signal in the embodiment.

FIG. 14 is a timing chart illustrating an example of operations of the synchronization section 350 and the dividing section 360 in the present embodiment.

The ADC 312 generates the digital data D3 in synchronization with the clock signal ck_a3. The input-side counter 351 counts the count values in_cnt from 0 to 3 in synchronization with the clock signal ck_a3. The input-side buffer control section 352 generates the input-side set signal in_set when the count value in_cnt becomes "3". When the input-side set signal in_set is generated, the input-side buffer 353 holds four pieces of digital data D3 as stack data D3_stack. The toggle circuit 354 inverts the value of the toggle signal in_togl every time the input-side set signal in_set is generated.

The output-side buffer control section 355 holds the toggle signal in_togl in synchronization with the clock signal ck_b, and supplies the held toggle signal in_togl as the toggle signal in_togl_1. The output-side buffer control section 355 holds the toggle signal in_togl_1 in synchronization with the clock signal ck_b, and supplies the held toggle signal in_togl_1 as the toggle signal in_togl_2. The output-side buffer control section 355 asserts the output-side set signal out_set when either the toggle signal in_togl_1 or the toggle signal in_togl_2 is at the high level.

When the output-side set signal out_set is asserted, the output-side buffer 356 holds the stack data D3_stack as the stack data D3'_stack configured of four pieces of digital data D3'. Thus, the digital data D3 is transferred onto the clock signal ck_b. The stack data D3'_stack is divided into twelve pieces of digital data d3 to be read.

The output-side counter 361 counts up the count values out_cnt from the initial value (for example, "0") in synchronization with the clock signal ck_b. It is to be noted that, when the count value out_cnt is 12, that value is held. The output-side counter 361 sets the count value out_cnt to the initial value when the output-side set signal out_set is supplied.

The selector 362 selects any piece of digital data d3 in the stack data D1'_stack, based on the count value out_cnt. It is to be noted that the selector 362 selects the eleventh piece of digital data d3 when the count value out_cnt is "12".

The flag generation section 363 generates the flag f3 set at the high level when the count value out_cnt is any of 0, 3, 6, and 9. The memory control section 364 sets the memory control signal V3 at the low level when the count value out_cnt becomes a predetermined value (for example, "12"), and otherwise sets the memory control signal V3 at the high level.

Figure 15:
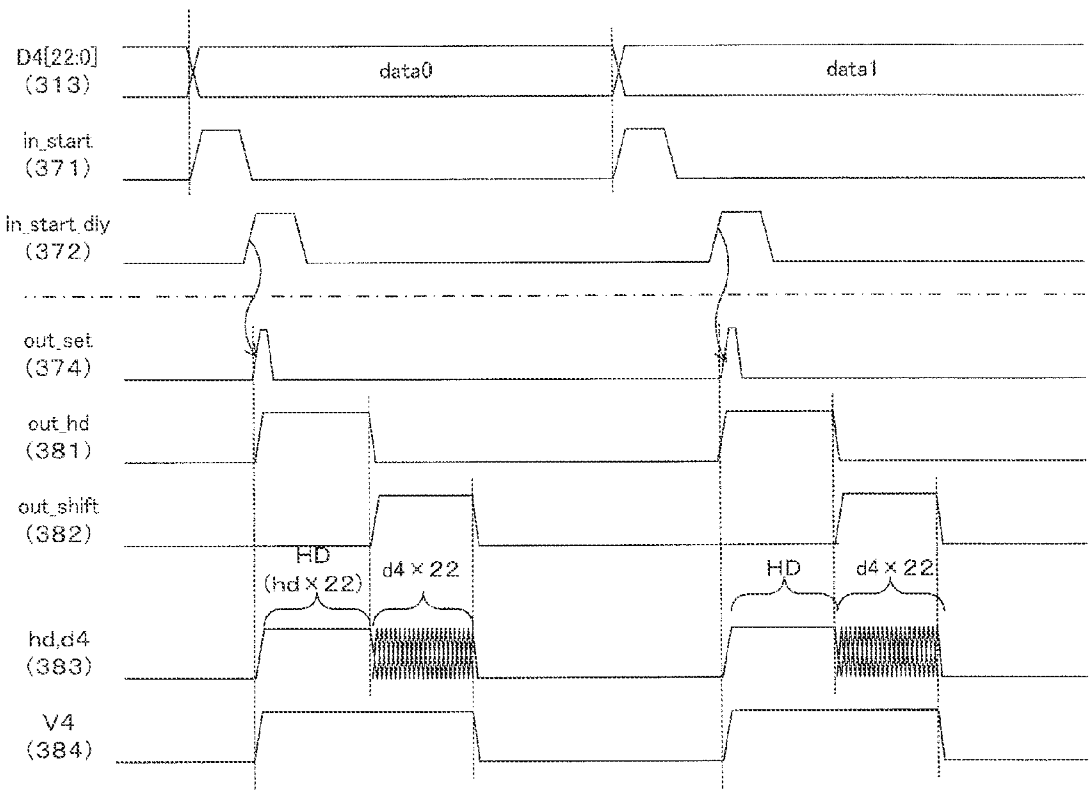
FIG. 15 is a timing chart illustrating an example of an operation of the synchronization section and the dividing section for the audio signal in the embodiment.

FIG. 15 is a timing chart illustrating an example of operations of the synchronization section 370 and the dividing section 380 in the present embodiment.

The ADC 313 generates the digital data D4 in synchronization with the clock signal ck_a4. The decoder 371 generates the start signal in_start every time the digital data D4 is decoded. The delay section 372 generates the start signal in_start_dly obtained by delaying the start signal in_start for a certain period. The set control section 374 generates the output-side set signal out_set when the start signal in_start_dly is generated.

The header attachment control section 381 generates the header attachment control signal out_hd when the output-side set signal out_set is generated. The data output control section 382 generates the shift control signal out_shift after the header attachment control signal out_hd is supplied.

The shift register 373 holds the digital data D4 as the digital data D4' when the output-side set signal out_set is generated. When the shift control signal out_shift is supplied, the shift register 373 shifts the digital data D4' in synchronization with the clock signal ck_b, and sequentially outputs the respective pieces of digital data d4 from the n-number of stages of flip-flops. It is to be noted that the operation of the shift register 373 is not illustrated in FIG. 15.

The header attachment section 383 generates the header HD when the header attachment control signal out_hd is supplied, and sequentially supplies the bits hd of the header HD to the memory 317 in synchronization with the clock signal ck_b. The header attachment section 383 sequentially supplies the respective pieces of digital data d4 supplied from the shift register 373 to the memory 317 in synchronization with the clock signal ck_b after transmitting the header HD.

The memory control section 384 sets the memory control signal V4 at the high level when the header attachment control signal out_hd or the shift control signal out_shift is supplied, and sets the memory control signal V4 at the low level when neither the header attachment control signal out_hd nor the shift control signal out_shift is supplied.

Figure 16:
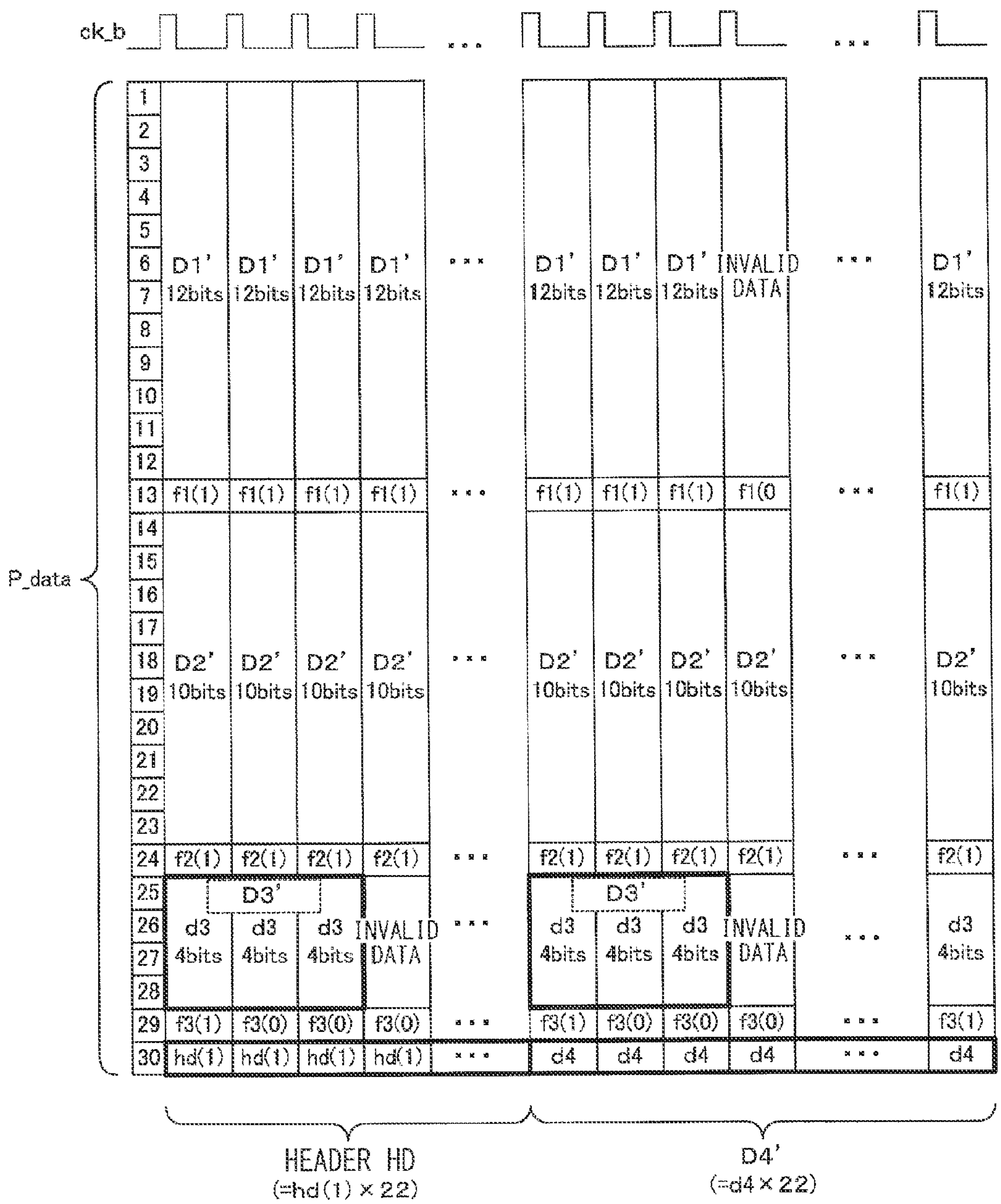
FIG. 16 is a diagram illustrating an example of a data configuration of pixel data in the embodiment.

FIG. 16 illustrates an example of the data configuration of pixel data P_data in the present embodiment. The video stream generation section 390 generates the pixel data P_data having a predetermined region in which the digital data D1', D2', and d3, the flags f1, f2, and f3, and either of the bit hd and the digital data d4 are stored.

For example, the digital data D1' of 12 bits may be stored in a region from the 1st bit to the 12th bit in the pixel data P_data of 30 bits. The flag f1 may be stored in the 13th bit. The digital data D2' of 10 bits may be stored in a region from the 14th bit to the 23th bit, and the flag f2 may be stored in the 24th bit. The digital data d3 of 4 bits that is obtained by dividing the digital data D3' into three pieces may be stored in a region from the 25th bit to the 28th bit. The flag f3 may be stored in the 29th bit, and the bit hd of the header HD or the digital data d4 of the digital data D4 may be stored in the 30th bit. In this example, an invalid bit (for example, a bit of "0") may be stored in the 30th bit when neither the bit hd nor the digital data d4 is read from the memory 317.

Figure 17:
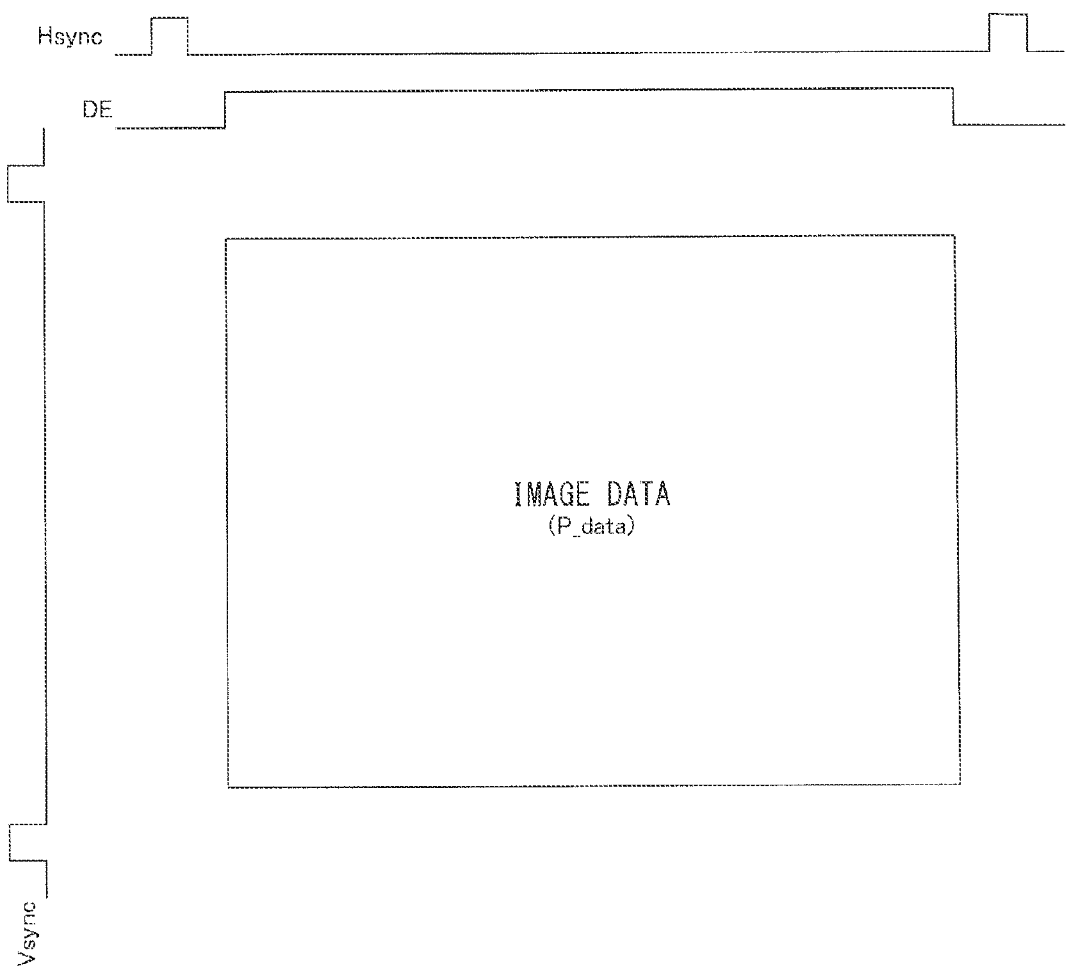
FIG. 17 is a timing chart illustrating an example of generation timing of synchronization signals and data enable signals in the embodiment.

FIG. 17 is a timing chart illustrating an example of a generation timing of the synchronization signal and the data enable signal in the present embodiment. The video stream generation section 390 generates the vertical synchronous signal Vsync at a timing when the image data is scanned in the vertical direction. The video stream generation section 390 generates the horizontal synchronous signal Hsync at a timing when that image data is scanned in the horizontal direction. The video stream generation section 390 generates the data enable signal DE set at the high level in a period for transmitting the valid pixel data P_data.

Figure 18:
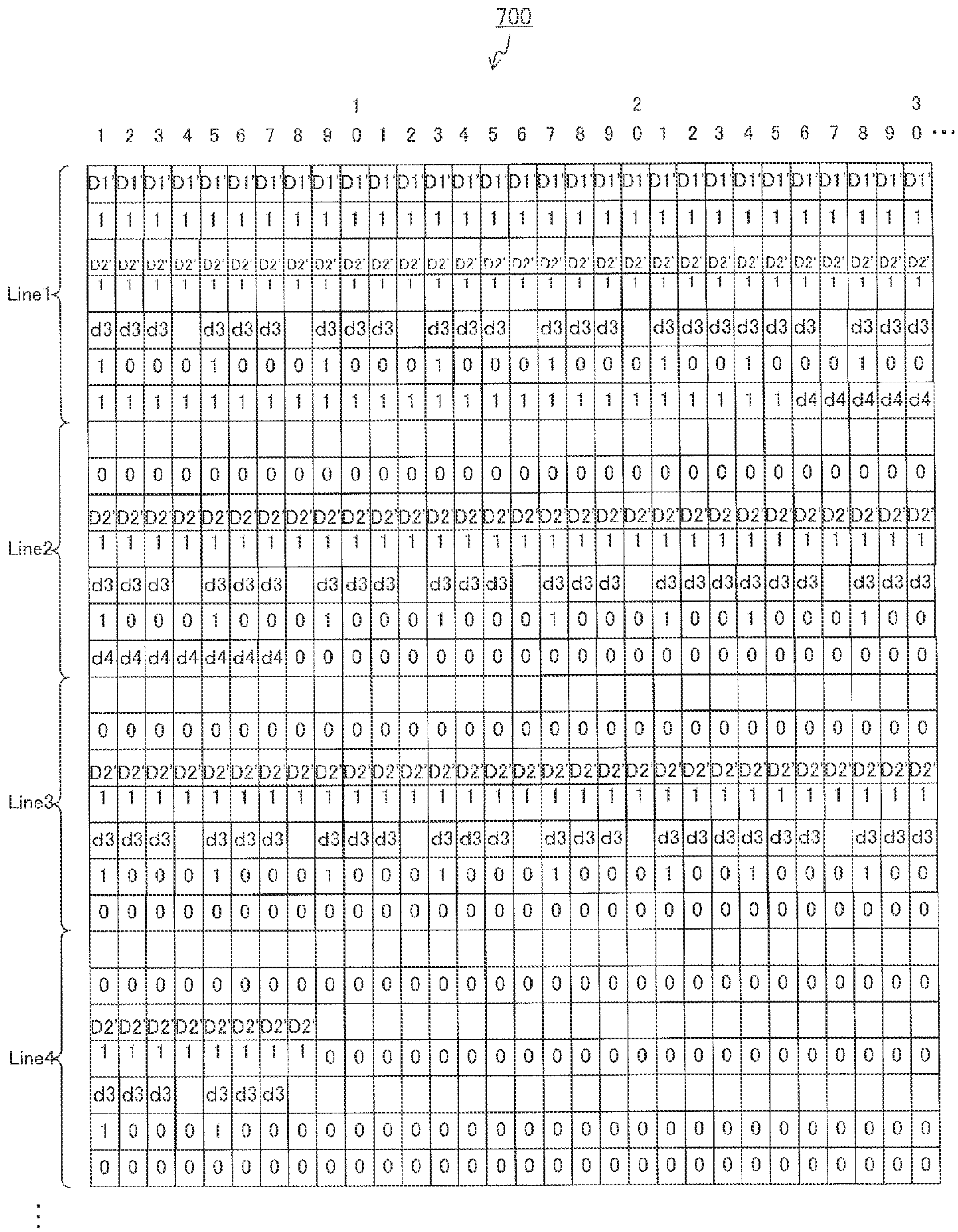
FIG. 18 is a diagram illustrating an example of a data configuration of image data in the embodiment.

FIG. 18 illustrates an example of a data configuration of image data in the present embodiment. In FIG. 18, a blank region is a region in which invalid data is stored. The image data is configured of a plurality of horizontal lines, and each of the horizontal lines is configured of a plurality of pieces of pixel data. The digital data D1', D2', and d3 and the flags f1, f2, and f3 are stored in the 1st to 29th bits of the respective pixel data. Also, in the 30th bit of the pixel data, the bit hd of the header HD or the digital data d4 is stored.

[Configuration Example of Receiving Section]

Figure 19:
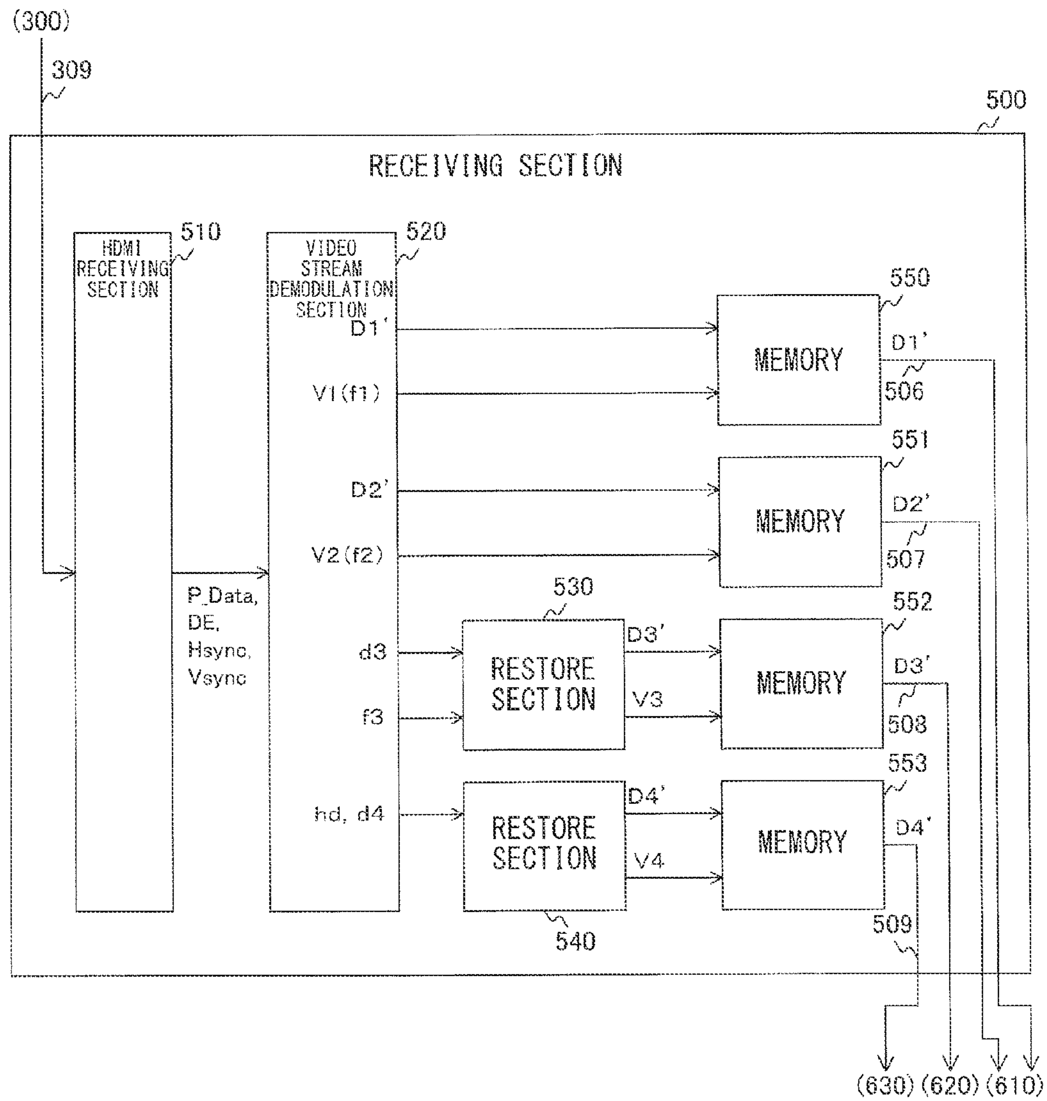
FIG. 19 is a block diagram illustrating a configuration example of a receiving section in the embodiment.

FIG. 19 is a block diagram illustrating a configuration example of the receiving section 500 in the present embodiment. The receiving section 500 includes a HDMI receiving section 510, a video stream demodulation section 520, restore sections 530 and 540, and memories 550 to 553.

The HDMI receiving section 510 receives a video stream from the source device 100 in accordance with the HDMI standard. The HDMI receiving section 510 supplies the received video stream to the video stream demodulation section 520. The HDMI receiving section 510 generates a clock signal ck_c having a frequency same as that of the clock signal ck_b, and supplies the generated clock signal ck_c to the restore sections 530 and 540.

The video stream demodulation section 520 separates (in other words, demodulates) the pixel data from the video stream. The video stream demodulation section 520 separates the pixel data P_data from the video stream, based on the synchronous signals (i.e., the vertical synchronous signal Vsync and the horizontal synchronous signal Hsync) and the data enable signal DE in the video stream.

The video stream demodulation section 520 takes the digital data D1' and the flag f1 from the pixel data P_data, and controls the memory 550 with the use of the flag f1 to allow the memory 550 to hold the digital data D1'. The video stream demodulation section 520 takes the digital data D2' and the flag f2 from the pixel data P_data, and controls the memory 550 with the use of the flag f2 to allow the memory 550 to hold the digital data D2'. The video stream demodulation section 520 takes the digital data d3 and the flag f3 from the pixel data P_data, and supplies the taken digital data d3 and the taken flag f3 to the restore section 530. Also, the video stream demodulation section 520 takes the bit hd or the digital data d4 from the pixel data P_data and supplies the taken bit hd or the taken digital data d4 to the restore section 540.

It is to be noted that the HDMI receiving section 510 and the video stream demodulation section 520 are specific but not limitative examples of "data receiving section" of one embodiment of the present technology.

The restore section 530 restores the digital data D3 from the plurality of pieces of digital data d3, based on the flag f3. Specifically, the restore section 530 synthesizes a predetermined number (for example, "3") of pieces of digital data d3 that have been sequentially received from the time when the flag f3 having a value of "1" is received, and thereby, restores the digital data D3'. The restore section 530 controls the memory 552 with the use of the memory control signal V3, and allows the memory 552 to hold the digital data D3'.

The restore section 540 restores the digital data D4 from the plurality of pieces of digital data d4, based on the header HD. Specifically, the restore section 540 synthesizes a predetermined number (for example, "22") of pieces of digital data d4 that have been sequentially received from reception of the header HD of a predetermined number (for example, "22") of bits hd, and thereby, restores the digital data D4'. The restore section 530 controls the memory 553 with the use of the memory control signal V4, and allows the memory 553 to hold the digital data D4'.

The memory 550 holds the digital data D1' in accordance with the control of the video stream demodulation section 520. The memory 551 holds the digital data D2' in accordance with the control of the video stream demodulation section 520. The memory 552 holds the digital data D3' in accordance with the control of the demodulation section 530. The memory 553 holds the digital data D4' in accordance with the control of the demodulation section 540.

The digital data D1' and D2' held by the memories 550 and 551, respectively, are supplied to the digital integrated circuit 610. The digital data D3' held in the memory 552 is supplied to the digital integrated circuit 620. The digital data D4' held in the memory 553 is supplied to the digital integrated circuit 630.

[Configuration Example of Restore Section]

Figure 20:
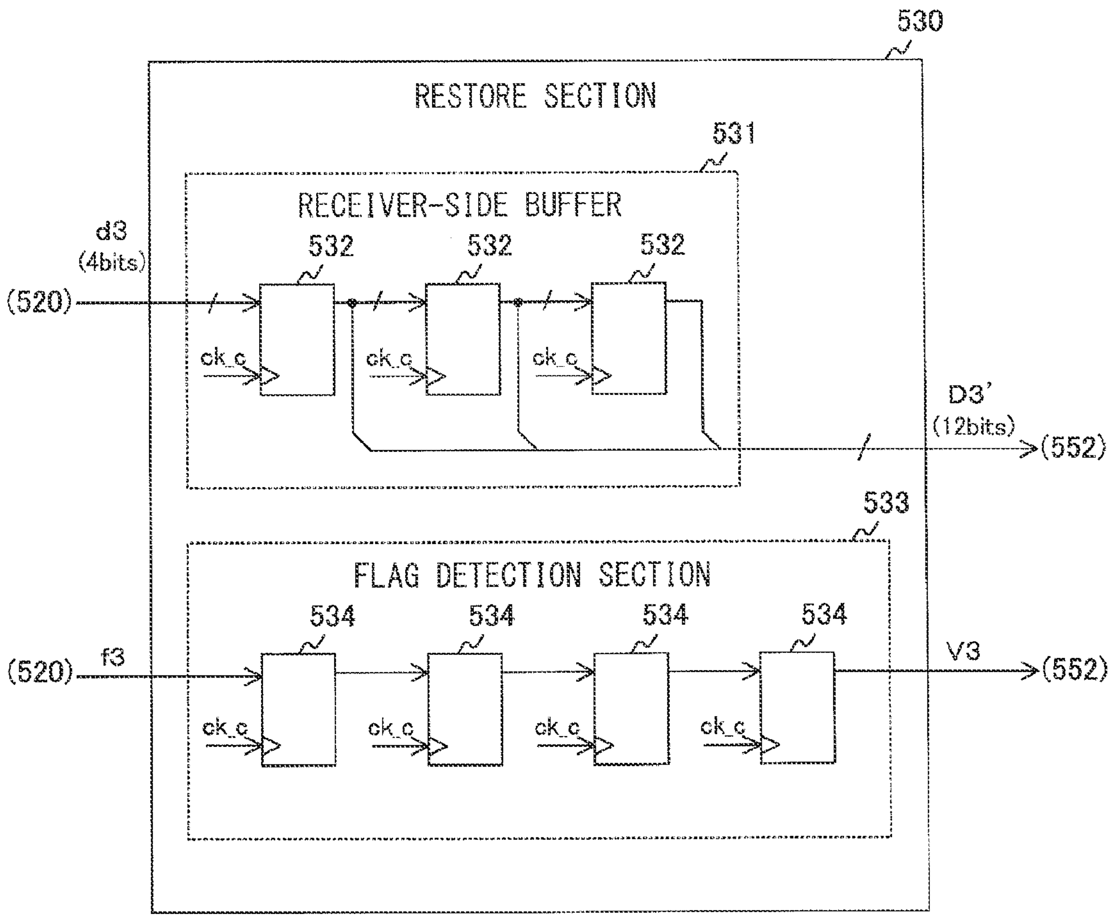
FIG. 20 is a block diagram illustrating a configuration example of a restore section that restores the intermediate frequency signal in the embodiment.

FIG. 20 is a block diagram illustrating a configuration example of the restore section 530 that restores the intermediate frequency signal in the present embodiment. The restore section 530 includes a receiver-side buffer 531 and a flag detection section 533.

The receiver-side buffer 531 holds a plurality of pieces of digital data d3. The receiver-side buffer 531 includes at least m-number of stages of registers 532. In this example, "m" is the number of pieces into which the digital data D3' is divided, and may be "3", for example.

The register 532 holds the digital data d3 in synchronization with the clock signal ck_c that has a frequency same as that of the clock signal ck_b. The registers 532 from the first stage to the (m−1)th stage supply the held digital data d3 to the registers 532 of latter stages and to the memory 552. The register 532 of the m-th stage supplies the held digital data d3 to the memory 552.

The flag detection section 533 detects the flag f3. The flag detection section 533 includes at least (m+1)-number of stages of flip-flops 534.

The flip-flop 534 holds the flag f3 in synchronization with the clock signal ck_c. The flip-flops 534 of the first stage to the m-th stage supply the held flag f3 to the flip-flops 534 of the latter stages. The flip-flop 534 of the (m+1)th stage supplies the flag f3 as the memory control signal V3 to the memory 552.

The memory 552 reads m-number of pieces of digital data d3 from the register 532 of the m-th stage and holds the data configured of the read m-number of pieces of digital data d3 as digital data D3 when the memory control signal V3 (i.e., the flag f3) is at the high level. Thus, the digital data D3 is restored.

Figure 21:
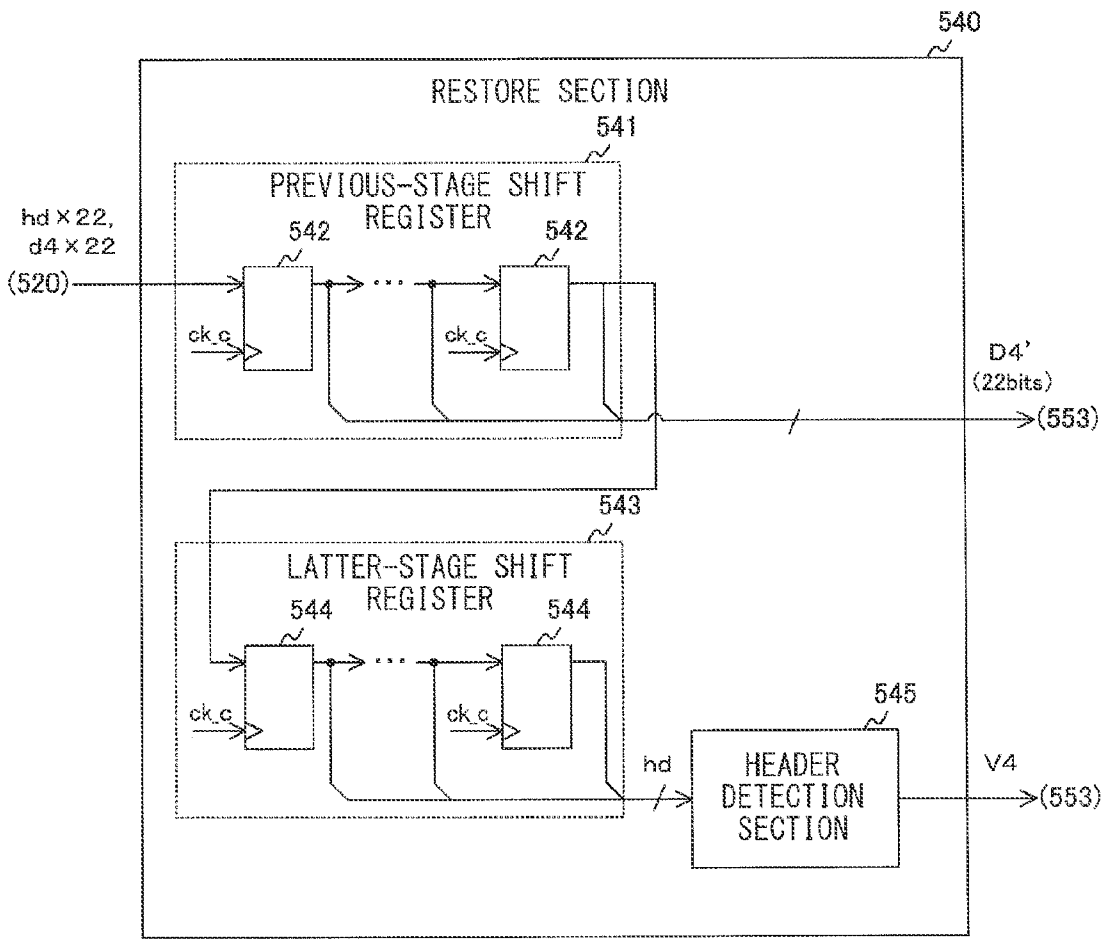
FIG. 21 is a block diagram illustrating a configuration example of a restore section that restores the audio signal in the embodiment.

FIG. 21 is a block diagram illustrating a configuration example of the restore section 540 that restores the audio signal in the present embodiment. The restore section 540 includes a previous-stage shift register 541, a latter-stage shift register 543, and a header detection section 545.

The previous-stage shift register 541 holds the digital data D4 and the header HD in synchronization with the clock signal ck_c. The previous-stage shift register 541 includes at least n-number of stages of flip-flops 542. In this example, "n" is a value of a data size of the digital data D4 and the header HD, and may be "22", for example.

The flip-flop 542 holds the bit hd of the head HD or the digital data d4 in synchronization with the clock signal ck_c. The flip-flops 542 of the first stage to the (n−1)th stage supply the held data to the flip-flops 542 of the latter stages and to the memory 553. The flip-flop 542 of the n-th stage supplies the held data to the latter-stage shift register 543 and to the memory 553.

The latter-stage shift register 543 holds the header HD in synchronization with the clock signal ck_c. The latter-stage shift register 543 includes at least n-number of stages of flip-flops 544.

The flip-flop 544 holds the bit hd of the header HD in synchronization with the clock signal ck_c. The flip-flops 544 of the first stage to the (n−1)th stage supply the held data to the flip-flops 544 of the latter stages and to the header detection section 545. Also, the flip-flop 544 in the n-th stage supplies the held data to the header detection section 545.

The header detection section 545 detects the header HD. The header detection section 545 determines whether or not the data held by the latter-stage shift register 543 corresponds to the header HD. When the data is the header HD, the header detection section 545 controls the memory 553 with the use of the memory control signal V4, and allows the memory 553 to hold the data of n bits in the previous-stage shift register 541 as the digital data D4. Thus, the digital data D4 is restored.

[Operation Example of Source Device]

Figure 22:
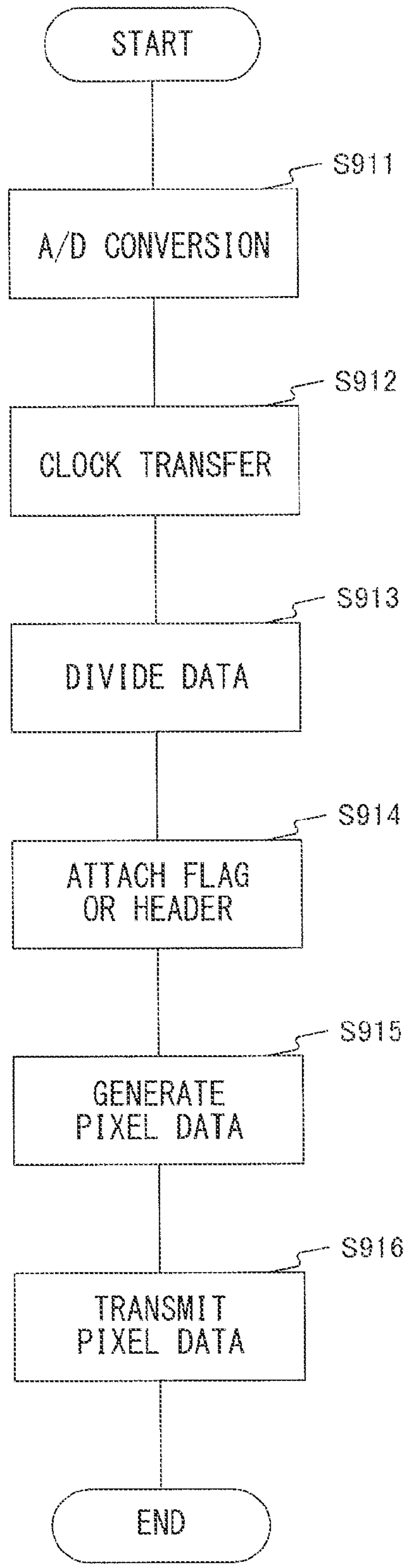
FIG. 22 is a flow chart illustrating an example of an operation of a source device according to the embodiment.

FIG. 22 is a flow chart illustrating an example of an operation of the source device 100 in the present embodiment. The source device 100 performs A/D conversion on the respective plurality of pieces of analog data with the use of different sampling frequencies, and thereby, generates a plurality of pieces of digital data (step S911). The source device 100 transfers the plurality of pieces of digital data onto the clock signal ck_b, and synchronizes the plurality of pieces of digital data (step S912). The source device 100 divides low-speed data (such as an audio signal and an intermediate frequency signal) in the plurality of pieces of data (step S913), and attaches a flag or a header to the respective divided pieces of data (step S914). The source device 100 generates pixel data, and stores the digital data, the flag, etc. in the pixel data (step S915). The source device 100 transmits the pixel data via one HDMI cable (step S916).

[Operation Example of Sink Device]

Figure 23:
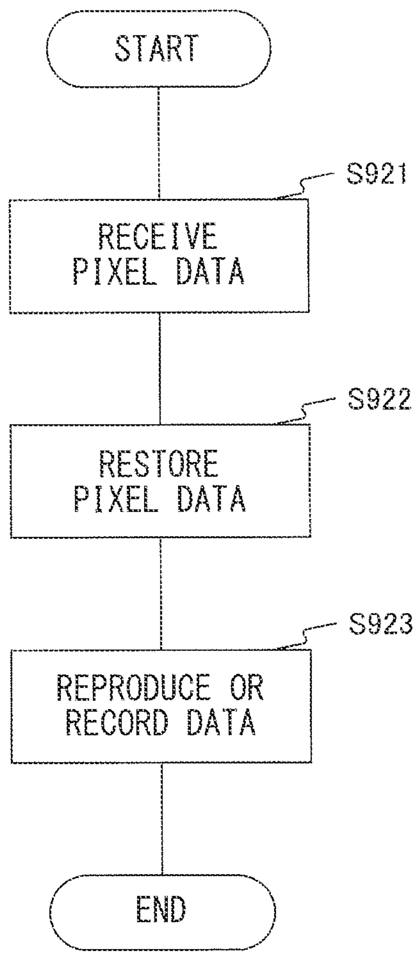
FIG. 23 is a flow chart illustrating an example of an operation of a sink device according to the embodiment.

FIG. 23 is a flow chart illustrating an example of an operation of the sink device 400 in the present embodiment. The sink device 400 receives the pixel data via one HDMI cable (step S921). The sink device 400 restores the digital data before being divided, from the divided pieces of digital data in the pixel data (step S922). The sink device 400 reproduces or records the digital data (step S923).

In such a manner, according to the above-described embodiment, the source device 100 divides low-speed data (such as D3) and stores the divided pieces of low-speed data together with high-speed data (such as D1) in data having a predetermined data size to transmit the data. Therefore, the plurality of pieces of data having different speeds are allowed to be transmitted via one cable. Therefore, the number of terminals used for transmitting and receiving data is allowed to be reduced in the source device 100 and the sink device 400. This reduction in the number of terminals reduces cost of the devices, and also allows dimensions of the devices to be smaller.

2. Modifications

In the above-described embodiment, data is transmitted in accordance with the HDMI standard. However, the data may be transmitted in accordance with standards other than the HDMI standard. For example, the data may be transmitted in accordance with the standard of PCIe (PCI-Express). A transmitting section 300 in a modification is different from that in the above-described embodiment in that the data is transmitted in accordance with the PCIe standard.

It is to be noted that the above-described embodiment is only an example for embodying the present technology. The components described above in the embodiment correspond to respective element in the claims. In a similar manner, the elements in the claims correspond to the respective components having the same name in the above-described embodiments of the present technology. However, the present technology is not limited to the above-described embodiment, and may be embodied by variously modifying the above-described embodiment without departing from its gist.

Moreover, the process procedures described in the above embodiment may be regarded as a method including the series of procedures, or may be regarded as a program to allow a computer to execute the series of procedures or a recording medium to store the program. Examples of such a recording medium may include a CD (Compact Disc), a MD (MiniDisc), a DVD (Digital Versatile Disk), a memory card, and a Blue-ray Disc (registered trademark).

It is possible to achieve at least the following configurations from the above-described example embodiment and the modifications of the disclosure.

(1) A source device including:

a low-speed data supply section configured to supply, as low-speed data, data generated in synchronization with a low clock signal out of a plurality of clock signals having different frequencies, the low clock signal having a frequency that is lower than a predetermined value;

a high-speed data supply section configured to supply, as high-speed data, data generated in synchronization with a high clock signal out of the plurality of clock signals, the high clock signal having a frequency that is higher than the frequency of the low clock signal;

a dividing section configured to divide the low-speed data into a predetermined number of pieces of data, the predetermined number being in accordance with a ratio of the frequency of the high clock signal with respect to the frequency of the low clock signal; and a data transmitting section configured to store the high-speed data and the divided pieces of low-speed data in data having a predetermined data size, and to transmit the stored data.

(2) The source device according to (1), further including a holding section configured to hold, in synchronization with the high clock signal, the supplied low-speed data as the predetermined number of pieces of data, wherein the dividing section sequentially reads, in synchronization with the high clock signal, the respective predetermined number of pieces of data from the holding section, and supplies the read predetermined number of pieces of data as the divided pieces of low-speed data.

(3) The source device according to (2), wherein the dividing section includes a counter configured to count a count value in synchronization with the high clock signal, and a selector configured to sequentially select, based on the count value, the respective predetermined number of pieces of data, and read the selected respective predetermined number of pieces of data.

(4) The source device according to (2) or (3), wherein the holding section includes a shift register configured to hold the low-speed data, and to shift and sequentially output respective bits of the held low-speed data in accordance with control by the dividing section, and the dividing section sequentially supplies, as the divided pieces of low-speed data, the respective bits of the low-speed data output from the shift register in synchronization with the high clock signal.

(5) The source device according to any one of (1) to (4), wherein the high-speed data includes image data, and the low-speed data includes audio data.

(6) The source device according to any one of (1) to (5), wherein the high-speed data includes uncompressed data that is not compressed, and the low-speed data includes compressed data that is compressed to a data size smaller than a data size of the uncompressed data.

(7) The source device according to any one of (1) to (6), wherein the low-speed data supply section supplies, as the low-speed data, digital data that is converted from predetermined analog data in synchronization with the low clock signal.

(8) The source device according to any one of (1) to (7), wherein the high-speed data supply section supplies, as the high-speed data, digital data that is converted from predetermined analog data in synchronization with the high clock signal.

(9) A communication system including:

a low-speed data supply section configured to supply, as low-speed data, data generated in synchronization with a low clock signal out of a plurality of clock signals having different frequencies, the low clock signal having a frequency that is lower than a predetermined value;

a high-speed data supply section configured to supply, as high-speed data, data generated in synchronization with a high clock signal out of the plurality of clock signals, the high clock signal having a frequency that is higher than the frequency of the low clock signal;

a dividing section configured to divide the low-speed data into a predetermined number of pieces of data, the predetermined number being in accordance with a ratio of the frequency of the high clock signal with respect to the frequency of the low clock signal; and a data transmitting section configured to store the high-speed data and the divided pieces of low-speed data in data having a predetermined data size, and to transmit the stored data;

a data receiving section configured to receive the transmitted data having the predetermined data size; and a restore section configured to restore the low-speed data before being divided from the divided pieces of low-speed data in the received data having the predetermined data size.

(10) The communication system according to (9), wherein the dividing section generates a flag indicating whether or not the divided piece of low-speed data is data to be transmitted first in a clock cycle of the low-clock signal, the data transmitting section further stores the flag in the data having the predetermined data size, and the restore section restores the low-speed data before being divided from the predetermined number of the divided pieces of low-speed data that are sequentially received from reception of the flag indicating that the divided piece of low-speed data is the data to be transmitted first.

(11) The communication system according to (9) or (10), wherein the dividing section starts division of the low-speed data after generating header information, dividing the header information, and supplying the divided pieces of header information to the data transmitting section, the header information indicating a timing to start transmission of the low-speed data, the data transmitting section starts transmission of the data having the predetermined data size in which the divided pieces of low-speed data is stored after storing the divided pieces of header information in the data having the predetermined data size and transmitting the stored data, and the restore section starts restoration of the low-speed data after restoring the header information.

(12) A method of controlling a source device, the method including:

supplying, through a low-speed data supply section, as low-speed data, data generated in synchronization with a low clock signal out of a plurality of clock signals having different frequencies, the low clock signal having a frequency that is lower than a predetermined value;

supplying, through a high-speed data supply section, as high-speed data, data generated in synchronization with a high clock signal out of the plurality of clock signals, the high clock signal having a frequency that is higher than the frequency of the low clock signal;

dividing, through a dividing section. the low-speed data into a predetermined number of pieces of data, the predetermined number being in accordance with a ratio of the frequency of the high clock signal with respect to the frequency of the low clock signal; and storing, through a data transmitting section, the high-speed data and the divided pieces of low-speed data in data having a predetermined data size, and transmitting, through the data transmitting section, the stored data.

It should be understood by those skilled in the art that various modifications, combinations, sub-combinations, and alterations may occur depending on design requirements and other factors insofar as they are within the scope of the appended claims or the equivalents thereof.

What is claimed is:

1. A source device comprising:

a low-speed data supply section configured to supply, as low-speed data, data generated in synchronization with a low clock signal out of a plurality of clock signals having different frequencies, the low clock signal having a frequency that is lower than a predetermined value;

a high-speed data supply section configured to supply, as high-speed data, data generated in synchronization with a high clock signal out of the plurality of clock signals, the high clock signal having a frequency that is higher than the frequency of the low clock signal;

a dividing section configured to divide the low-speed data into a predetermined number of pieces of data, the predetermined number being in accordance with a ratio of the frequency of the high clock signal with respect to the frequency of the low clock signal; and a data transmitting section configured to store the high-speed data and the divided pieces of low-speed data in data having a predetermined data size, and to transmit the stored high-speed data and divided pieces of low-speed data.

2. The source device according to claim 1, further comprising a holding section configured to hold, in synchronization with the high clock signal, the supplied low-speed data as the predetermined number of pieces of data, wherein the dividing section sequentially reads, in synchronization with the high clock signal, the respective predetermined number of pieces of data from the holding section, and supplies the read predetermined number of pieces of data as the divided pieces of low-speed data.

3. The source device according to claim 2, wherein the dividing section includes a counter configured to count a count value in synchronization with the high clock signal, and a selector configured to sequentially select, based on the count value, the respective predetermined number of pieces of data, and read the selected respective predetermined number of pieces of data.

4. The source device according to claim 2, wherein the holding section includes a shift register configured to hold the low-speed data, and to shift and sequentially output respective bits of the held low-speed data in accordance with control by the dividing section, and the dividing section sequentially supplies, as the divided pieces of low-speed data, the respective bits of the low-speed data output from the shift register in synchronization with the high clock signal.

5. The source device according to claim 1, wherein the high-speed data includes image data, and the low-speed data includes audio data.

6. The source device according to claim 1, wherein the high-speed data includes uncompressed data that is not compressed, and the low-speed data includes compressed data that is compressed to a data size smaller than a data size of the uncompressed data.

7. The source device according to claim 1, wherein the low-speed data supply section supplies, as the low-speed data, digital data that is converted from predetermined analog data in synchronization with the low clock signal.

8. The source device according to claim 1, wherein the high-speed data supply section supplies, as the high-speed data, digital data that is converted from predetermined analog data in synchronization with the high clock signal.

9. A communication system comprising:

a low-speed data supply section configured to supply, as low-speed data, data generated in synchronization with a low clock signal out of a plurality of clock signals having different frequencies, the low clock signal having a frequency that is lower than a predetermined value;

a high-speed data supply section configured to supply, as high-speed data, data generated in synchronization with a high clock signal out of the plurality of clock signals, the high clock signal having a frequency that is higher than the frequency of the low clock signal;

a dividing section configured to divide the low-speed data into a predetermined number of pieces of data, the predetermined number being in accordance with a ratio of the frequency of the high clock signal with respect to the frequency of the low clock signal; and a data transmitting section configured to store the high-speed data and the divided pieces of low-speed data in data having a predetermined data size, and to transmit the stored high-speed data and divided pieces of low-speed data;

a data receiving section configured to receive the transmitted data having the predetermined data size; and a restore section configured to restore the low-speed data before being divided from the divided pieces of low-speed data in the received data having the predetermined data size.

10. The communication system according to claim 9, wherein the dividing section generates a flag indicating whether or not the divided piece of low-speed data is data to be transmitted first in a clock cycle of the low-clock signal, the data transmitting section further stores the flag in the data having the predetermined data size, and the restore section restores the low-speed data before being divided from the predetermined number of the divided pieces of low-speed data that are sequentially received from reception of the flag indicating that the divided piece of low-speed data is the data to be transmitted first.

11. The communication system according to claim 9, wherein the dividing section starts division of the low-speed data after generating header information, dividing the header information, and supplying the divided pieces of header information to the data transmitting section, the header information indicating a timing to start transmission of the low-speed data, the data transmitting section starts transmission of the data having the predetermined data size in which the divided pieces of low-speed data is stored after storing the divided pieces of header information in the data having the predetermined data size and transmitting the stored data, and the restore section starts restoration of the low-speed data after restoring the header information.

12. A method of controlling a source device, the method comprising:

supplying, through a low-speed data supply section, as low-speed data, data generated in synchronization with a low clock signal out of a plurality of clock signals having different frequencies, the low clock signal having a frequency that is lower than a predetermined value;

supplying, through a high-speed data supply section, as high-speed data, data generated in synchronization with a high clock signal out of the plurality of clock signals, the high clock signal having a frequency that is higher than the frequency of the low clock signal;

dividing, through a dividing section. the low-speed data into a predetermined number of pieces of data, the predetermined number being in accordance with a ratio of the frequency of the high clock signal with respect to the frequency of the low clock signal; and storing, through a data transmitting section, the high-speed data and the divided pieces of low-speed data in data having a predetermined data size, and transmitting, through the data transmitting section, the stored high-speed data and divided pieces of low-speed data.

13. The method according to claim 12, further comprising:

holding, in synchronization with the high clock signal, the supplied low-speed data as the predetermined number of pieces of data;

with the dividing section , sequentially reading in synchronization with the high clock signal, the respective predetermined number of pieces of data from the holding section, and supplying the read predetermined number of pieces of data as the divided pieces of low-speed data.

14. The method according to claim 13, further comprising:

with a counter included in the dividing section, counting a count value in synchronization with the high clock signal, and with a selector included in the dividing section, sequentially selecting, based on the count value, the respective predetermined number of pieces of data, and reading the selected respective predetermined number of pieces of data.

15. The method according to claim 13, wherein with a shift register included in the holding section, holding the low-speed data, and shifting and sequentially outputting respective bits of the held low-speed data in accordance with control by the dividing section, and with the dividing section, sequentially supplying as the divided pieces of low-speed data, the respective bits of the low-speed data output from the shift register in synchronization with the high clock signal.

16. The method according to claim 12, wherein the high-speed data includes image data, and the low-speed data includes audio data.

17. The method according to claim 12, wherein the high-speed data includes uncompressed data that is not compressed, and the low-speed data includes compressed data that is compressed to a data size smaller than a data size of the uncompressed data.

18. The method according to claim 12, further comprising:

with the low-speed data supply section, supplying, as the low-speed data, digital data that is converted from predetermined analog data in synchronization with the low clock signal.

19. The method according to claim 12, further comprising:

with the high-speed data supply section, supplying, as the high-speed data, digital data that is converted from predetermined analog data in synchronization with the high clock signal.

* * * * *